United States Patent
Ilkov et al.

(12) 
(10) Patent No.: US 6,523,961 B2
(45) Date of Patent: Feb. 25, 2003

(54) PROJECTION SYSTEM AND MIRROR ELEMENTS FOR IMPROVED CONTRAST RATIO IN SPATIAL LIGHT MODULATORS

(75) Inventors: Fedor A. Ilkov, Santa Clara, CA (US); Satyadev R. Patel, Elk Grove, CA (US); Peter W. Richards, Palo Alto, CA (US); John K. Stockton, Pasadena, CA (US)

(73) Assignee: Reflectivity, Inc., Sunnyvale, CA (US)

( * ) Notice: Subject to any disclaimer, the term of this patent is extended or adjusted under 35 U.S.C. 154(b) by 65 days.

(21) Appl. No.: 09/732,445

(22) Filed: Dec. 7, 2000

(65) Prior Publication Data

US 2002/0024641 A1 Feb. 28, 2002

Related U.S. Application Data

(60) Provisional application No. 60/229,246, filed on Aug. 30, 2000.

(51) Int. Cl.⁷ .............................................. G03B 21/28
(52) U.S. Cl. ..................... 353/99; 359/212; 359/292; 348/771
(58) Field of Search ................... 353/31, 98, 99; 345/31, 108; 348/742, 743, 771; 359/198, 212, 222, 291, 292, 323, 267, 298

(56) References Cited

U.S. PATENT DOCUMENTS

| | | | |
|---|---|---|---|
| 3,886,310 A | | 5/1975 | Guldberg et al. |
| 3,896,338 A | | 7/1975 | Nathanson et al. |
| 4,492,435 A | | 1/1985 | Banton et al. |
| 4,566,935 A | | 1/1986 | Hornbeck |
| 4,592,628 A | * | 6/1986 | Altman et al. |
| 4,596,992 A | | 6/1986 | Hornbeck |
| 4,615,595 A | | 10/1986 | Hornbeck |
| 4,662,746 A | | 5/1987 | Hornbeck |
| 4,710,732 A | | 12/1987 | Hornbeck |
| 4,956,619 A | | 9/1990 | Hornbeck |
| 5,028,939 A | | 7/1991 | Hornbeck et al. |

(List continued on next page.)

FOREIGN PATENT DOCUMENTS

| | | |
|---|---|---|
| EP | 0877272 A1 | 11/1998 |
| KR | 1019950050270 | 12/1995 |

OTHER PUBLICATIONS

Hornbeck, "Digital Light Processing (TM) for High–Brightnes, High–Resolution Applications", SPIE Photonics West, EI97, Feb. 1997.

(List continued on next page.)

Primary Examiner—William Dowling
(74) Attorney, Agent, or Firm—Gregory R. Muir

(57) ABSTRACT

In order to minimize light diffraction along the direction of switching and more particularly light diffraction into the acceptance cone of the projection optics, in the present invention, mirrors are provided which are not rectangular. Also, in order to minimize the cost of the illumination optics and the size of the display unit of the present invention, the light source is placed orthogonal to the rows (or columns) of the array, and/or the light source is placed orthogonal to a side of the frame defining the active area of the array. The incident light beam, though orthogonal to the sides of the active area, are not however, orthogonal to any substantial portion of sides of the individual mirrors in the array. Orthogonal sides cause incident light to diffract along the direction of mirror switching, and result in light 'leakage' into the on-state even if the mirror is in the off-state. This light diffraction decreases the contrast ratio of the mirror. The mirrors of the present invention result in an improved contrast ratio, and the arrangement of the light source to mirror array in the present invention results in a more compact system.

91 Claims, 19 Drawing Sheets

U.S. PATENT DOCUMENTS

| | | | |
|---|---|---|---|
| 5,552,924 A | | 9/1996 | Tregilgas |
| 5,629,794 A | | 5/1997 | Magel et al. |
| 5,659,374 A | * | 8/1997 | Gale, Jr. et al. ............ 348/771 |
| 5,696,619 A | * | 12/1997 | Knipe et al. ................ 359/224 |
| 5,719,695 A | | 2/1998 | Heimbuch |
| 5,757,539 A | | 5/1998 | Min |
| 5,835,256 A | | 11/1998 | Huibers |
| 5,914,803 A | | 6/1999 | Hwang et al. |
| 5,943,157 A | | 8/1999 | Florence et al. |
| 5,949,568 A | | 9/1999 | Koo et al. |
| 5,999,306 A | | 12/1999 | Atobe et al. |
| 6,038,056 A | | 3/2000 | Florence et al. |
| 6,046,840 A | | 4/2000 | Huibers |
| 6,123,985 A | * | 9/2000 | Robinson et al. ........... 427/162 |
| 6,128,121 A | * | 10/2000 | Choi et al. .................. 359/224 |
| 6,175,443 B1 | * | 1/2001 | Aksyuk et al. ............. 359/291 |
| 6,222,667 B1 | * | 4/2001 | Gobeli ....................... 359/323 |
| 6,288,828 B1 | * | 9/2001 | Hewlett ...................... 359/291 |
| 6,351,330 B2 | * | 2/2002 | Ko et al. .................... 359/298 |
| 6,359,669 B1 | | 3/2002 | Dehmlow |
| 2002/0005979 A1 | | 1/2002 | Bartlett et al. |

OTHER PUBLICATIONS

Kim et al., "Thin–film Micromirror Array (TMA) for High Luminance and Cost–Competitive Information Display Systems", SID Digest, 1999, pp. 982–985.

Kim et al., "Thin–film Micromirror Array (TMA) for Information Display Systems", Euro Display '99, Berlin.

Gregory et al, "Optical characteristics of a deformable–mirror spatial light modulator", Optics Letters, vol. 13, No. 1, Jan. 1988.

Hornbeck, "From cathode rays to digital micromirrors: A history of electronic projection display technology", TI Technical Journal, Jul.–Sep. 1998, pp. 7–46.

Thomas et al., "The Mirror Matrix Tube: A Novel Light Valve for Projection Displays", IEEE Transactions on Electron Devices, vol. Ed–22 No. 9, Sep. 1975, pp. 765–775.

Brooks, "Micromechanical light modulators for data transfer and processing", SPIE vol. 465, 1984, pp. 46–54.

Hornbeck, "Deformable–Mirror Spatial Light Modulator", SPIE vol. 1150, 1989, pp. 86–102.

Hornbeck, "Digital Light Processing and MEMS: Reflecting the Digital Display Needs of the Networked Society", SPIE vol. 2783, 1996, pp. 2–13.

Sampsell, "Digital micromirror device and its application to projection dispalays", J. Vac. Sci. Technol. B 12(6), Nov./Dec. 1994, pp. 3242–3246.

Mignardi, "Digital micromirror array for projection TV", Solid State Technology, Jul., 1994. pp. 63–68.

Younse et al, "The Digital Micromirror Device (DMD) and Its Transition to HDTV", Proc. of the 13th International Display Research Conf., 1993, pp. 613–616.

Sampsell, "An Overview of the Digital Micromirror Device (DMD) and Its Application to Projection Systems", SID Digest, 1993, pp. 1012–1015.

Hornbeck, "Digital Micromirror Device—Commercialization of a Massively Parallel MEMS Technology", Microelectromechanical Systems (MEMS)—ASME DSC v 62, Nov. 1997, 3–8.

* cited by examiner

PROJECTION SYSTEM AND MIRROR ELEMENTS FOR IMPROVED CONTRAST RATIO IN SPATIAL LIGHT MODULATORS

This application claims priority from U.S. provisional patent application No. 60/229,246, to Ilkov et al., filed Aug. 30, 2000.

BACKGROUND

1. Field of Invention

The present invention relates to movable micromirrors and micromirror arrays for direct-view and projection displays. U.S. Pat. Nos. 5,835,256 and 6,046,840 to Huibers, and U.S. patent application Ser. No. 09/617,419 to Huibers et al., the subject matter of each being incorporated herein by reference, disclose micro-electromechanical devices (MEMS) for steering light beams, such as in an optical switch, and/or for forming a display (e.g. a projection display). A common feature is a mirror element which is movable so as to deflect light through different angles, depending upon the mirror element's tilt angle. In one type of conventional direct view or projection display system, an array of reflective mirror elements are provided for producing an image. Typically the mirror elements are square.

2. Related Art

One type of micromirror array is disclosed in Kim et al. "Thin-film Micromirror Array (TMA) for High Luminance and Cost-competitive Information Display Systems", SPIE Photonics West, EI99 where an array of mirrors are microfabricated on a MOS addressing circuitry substrate. Each (square) mirror is addressed by the active matrix transistor array. Each mirror is held by a center post above a top electrode and a bottom electrode, which are in turn disposed above a supporting layer and the active matrix.

In Hornbeck's "Digital Light Processing for High-Brightness, High-Resolution Applications", a similar arrangement is disclosed. A (square) mirror is held on a post above a yoke and hinge and a mirror address electrode, which are in turn disposed above a yoke address electrode and a CMOS substrate.

In U.S. Pat. No. 6,038,056, the mirror elements are again square and the center post, also square, is disposed so that corresponding sides of each post and the mirror are parallel. The light source is placed at a 45 degree angle to the mirror array. One problem with such an arrangement, is that the light source must be placed at an angle from the mirror array (in the X, Y and Z axes) which increases the cost of the illumination optics and the overall size of the projection system.

SUMMARY OF THE INVENTION

In order to minimize light diffraction along the direction of switching and more particularly light diffraction into the acceptance cone of the projection optics, in the present invention, mirrors are provided which are not rectangular ("rectangular" as used herein including square mirrors). Diffraction as referred to herein, denotes the scattering of light off of a periodic structure, where the light is not necessarily monochromatic or phase coherent Also, in order to minimize the cost of the illumination optics and the size of the display unit of the present invention, the light source is placed orthogonal to the rows (or columns) of the array, and/or the light source is placed orthogonal to a side of the frame defining the active area of the array. The incident light beam, though orthogonal to the rows (or columns) and/or side of the active area, should not, however, be orthogonal to sides of the individual mirrors in the array. Orthogonal sides cause incident light to diffract along the direction of mirror switching, and result in light 'leakage' into the on-state even if the mirror is in the off-state. This light diffraction decreases the contrast ratio of the mirror.

The present invention optimizes the contrast ratio of the mirror array so that when mirrors are in their off-state they send minimal light to the spatial region where light is directed when mirrors are in their on-state. More specifically, the present invention comprises a particularly located light source and incident light beam and particularly designed mirrors in the array, which minimizes light diffracted into the acceptance cone of the projection (or viewing) optics, so as to provide an improved contrast ratio. The arrangement/design of the present invention also minimizes non-reflective areas in the array, by allowing for a tight fit of mirrors and a large fill factor with low diffraction from the off to the on-state, even when the array is illuminated along the axes of mirror periodicity. Namely, the design optimizes contrast ratio through angular sides non-parallel to the mirror's axis of rotation and optimizes fill factor through hinges that require a relatively small amount of area and allow neighboring mirrors to tile together with little wasted non-reflective area.

DETAILED DESCRIPTION

Mirror Fabrication

Figure 1A:
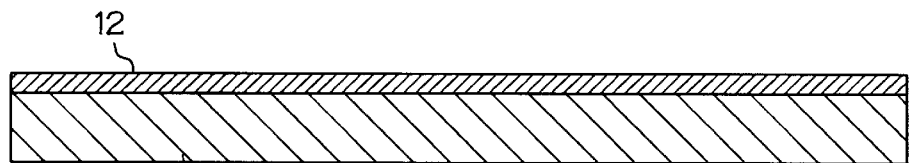
FIGS. 1A to 1D illustrate one method for forming conventional square mirrors.

Processes for microfabricating a movable micromirror or mirror array are disclosed in U.S. Pat. Nos. 5,835,256 and 6,046,840 both to Huibers, the subject matter of each being incorporated herein by reference. A similar process for forming (substantially square) movable elements (mirrors) on the light transmissive substrate is illustrated in FIGS. 1 to 4. As will be seen later, patterning posts, hinges, mirrors, etc. in accordance with the present invention involves a simple alteration of these processes. As can be seen in FIG. 1A, a light transmissive substrate 10 (at least prior to adding further layers thereon) such as glass, quartz, Pyrex™, sapphire, etc. is provided. A silicon upper wafer could also be used if the light to be modulated is IR light. The cross section of FIGS. 1A–D is taken along line 1—1 of FIG. 2. Because this cross section is taken along the hinge of the movable element, an optional block layer 12 can be provided to block light (incident through the light transmissive substrate during use) from reflecting off of the hinge and potentially causing diffraction and lowering the contrast ratio.

Figure 1B:
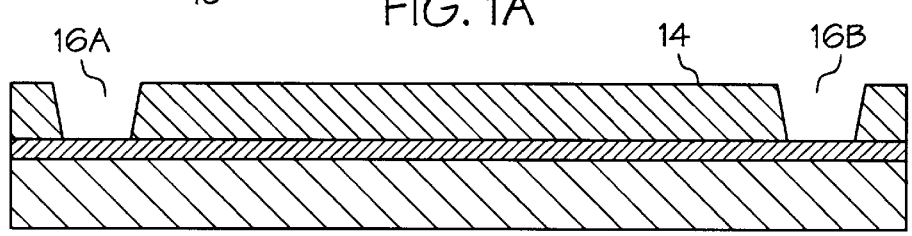

As can be seen in FIG. 1B, a sacrificial layer 14, such as amorphous silicon, is deposited. The thickness of the sacrificial layer can be wide ranging depending upon the movable element/mirror size and desired tilt angle, though a thickness of from 500 Å to 50,000 Å, preferably around 5000 Å is preferred. Alternatively the sacrificial layer could be a polymer or polyimide (or even polysilicon, silicon nitride, silicon dioxide, etc. depending upon the materials selected to be resistant to the etchant, and the etchant selected). A lithography step followed by a sacrificial layer etch forms holes 16a,b in the sacrificial silicon, which can be any suitable size, though preferably having a diameter of from 0.1 to 1.5 um, more preferably around 0.7+/−0.25 um. The etching is performed down to the glass/quartz substrate or down to the block layer if present. Preferably if the glass/quartz layer is etched, it is in an amount less than 2000 Å.

Figure 1C:
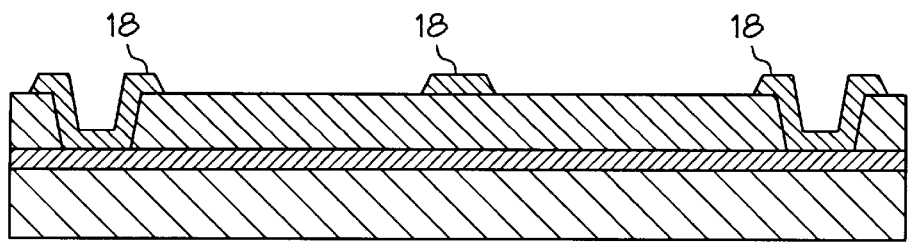

At this point, as can be seen in FIG. 1C, a first layer is deposited by chemical vapor deposition. Preferably the material is silicon nitride or silicon oxide deposited by LPCVD or PECVD, however polysilicon, silicon carbide or an organic compound could be deposited at this point (of course the sacrificial layer and etchant should be adapted to the material used). The thickness of this first layer can vary depending upon the movable element size and desired amount of stiffness of the element, however in one embodiment the layer has a thickness of from 100 to 3200 Å, more preferably around 1100 Å. The first layer undergoes lithography and etching so as to form gaps between adjacent movable elements on the order of from 0.1 to 25 um, preferably around 1 to 2 um.

Figure 1D:
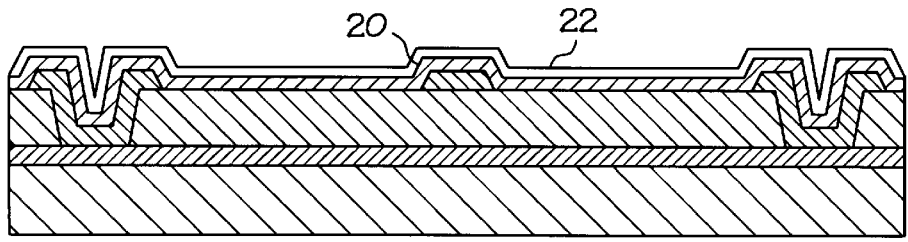
Figure 2:
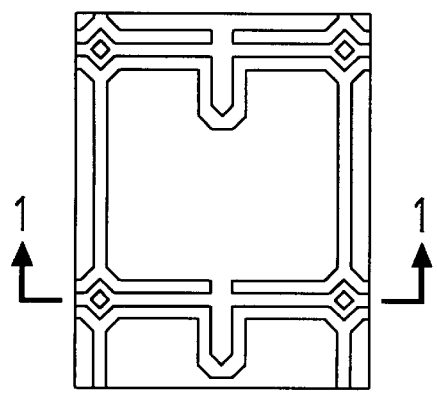
FIG. 2 is a top view of a conventional mirror showing line 1—1 for taking the cross section for FIGS. 1A to 1D.
Figure 3A:
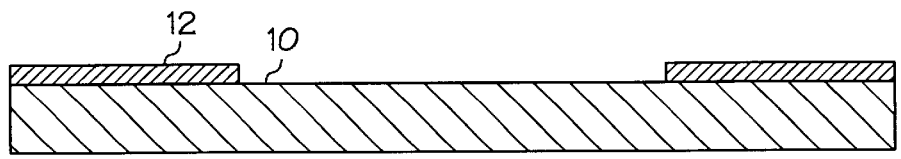
FIGS. 3A to 3D illustrate the same method as in FIGS. 1A to 1D but taken along a different cross section.
Figure 3B:
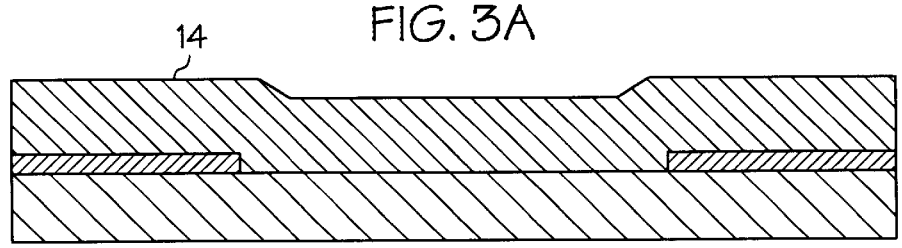
Figure 3C:
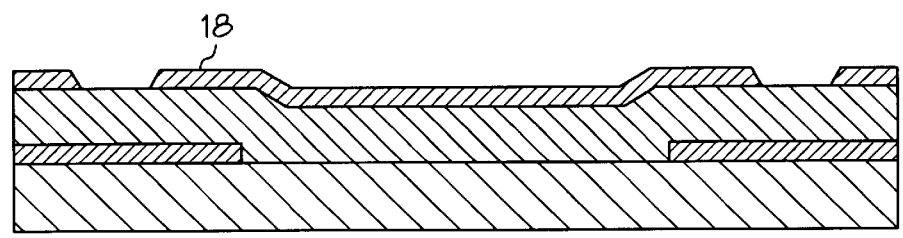
Figure 3D:
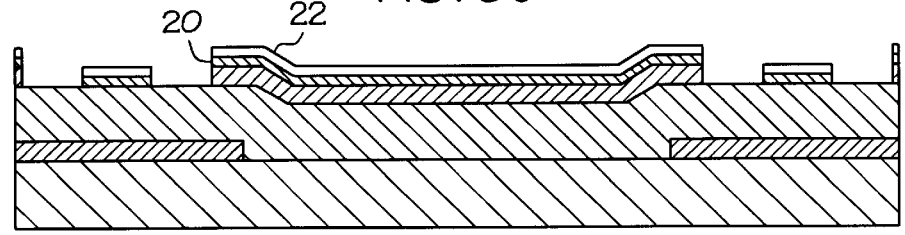
Figure 4:
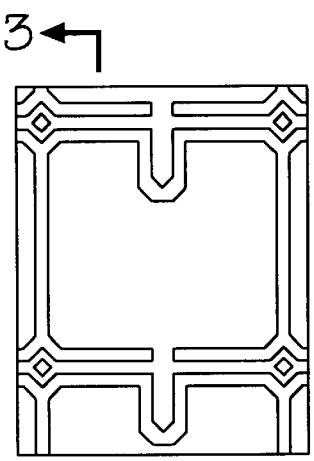
FIG. 4 is a top view of a mirror showing line 3—3 for taking the cross section for FIGS. 3A to 3D.

A second layer 20 is deposited as can be seen in FIG. 1D. The material can be the same (e.g. silicon nitride) as the first layer or different (silicon oxide, silicon carbide, polysilicon, etc.) and can be deposited by chemical vapor deposition as for the first layer. The thickness of the second layer can be greater or less than the first, depending upon the stiffness of the movable element, the flexibility of the hinge desired, the material used, etc. In one embodiment the second layer has a thickness of from 50 Å to 2100 Å, and preferably around 500 Å. In another embodiment, the first layer is deposited by PECVD and the second layer by LPCVD.

In the embodiment illustrated in FIGS. 1A to 1D, both the first and second layers are deposited in the area defining the movable (mirror) element, whereas the second layer, in the absence of the first layer, is deposited in the area of the hinge. However, it is also possible for the first and second layers to be deposited in the area of the movable element, with the first layer, but not the second, deposited in the area of the hinge. Depending upon a number of factors, including desired deflection distance, and dimensions of the hinge, the same layers (e.g. both first and second layers) can define both the hinge and mirror element.

It should be noted that a single layer could be provided in place of the two layers described above, though this could involve a tradeoff in plate stiffness and hinge flexibility. Also, if a single layer is used, the area forming the hinge could be partially etched to lower the thickness in this area and increase the flexibility of the resulting hinge. It is also possible to use more than two layers to produce a laminate movable element, which can be desirable particularly when the size of the movable element is increased such as for switching light beams in an optical switch. The materials for such layer or layers could also comprise alloys of metals and dielectrics or compounds of metals and nitrogen, oxygen or carbon (particularly the transition metals). Some of these alternative materials are disclosed in U.S provisional patent application No. 60/228,007, the subject matter of which is incorporated herein by reference.

As also seen in FIG. 1D, a reflective layer 22 is deposited. The reflective material can be gold, aluminum or other metal, or an alloy of more than one metal though it is preferably aluminum deposited by PVD. The thickness of the metal layer can be from 50 to 2000 Å, preferably around 500 Å. An optional metal passivation layer (not shown) can be added, e.g. a 10 to 1100 Å silicon oxide layer deposited by PECVD. Then, photoresist patterning on the metal layer is followed by etching through the metal layer with a suitable metal etchant. In the case of an aluminum layer, a chlorine (or bromine) chemistry can be used (e.g. a plasma/RIE etch with $Cl_2$ and/or $BCl_3$ (or Cl2, CCl4, Br2, $CBr_4$, etc.) with an optional preferably inert diluent such as Ar and/or He). It should be noted that the reflective layer need not be deposited last, but rather could be deposited directly upon the sacrificial layer 14, between other layers defining the mirror element, or as the only layer defining the mirror element. However, in some processes it may be desirable to deposit a metal layer after a dielectric layer due to the higher temperature at which many dielectrics are deposited.

The first and second layers can be etched subsequent to the reflective layer with known etchants or combinations of etchants (depending upon the material used and level of isotropy desired). For example, the first and second layers can be etched with a chlorine chemistry or a fluorine (or other halide) chemistry (e.g. a plasma/RIE etch with $F_2$, $CF_4$, $CHF_3$, $C_3F_8$, $CH_2F_2$, $C_2F_6$, $SF_6$, etc. or more likely combinations of the above or with additional gases, such as $CF_4/H_2$, $SF_6/Cl_2$, or gases using more than one etching species such as $CF_2Cl_2$, all possibly with one or more optional inert diluents). Of course, if different materials are used for the first layer and the second layer, then a different etchant can be employed for etching each layer.

Alternatively, the reflective layer can be deposited before the first and second layer and then patterning either independently or with the first or with the second layer.

FIGS. 3A to 3D illustrate the same process taken along a different cross section (cross section 3—3 in FIG. 4) and show the optional block layer 12 deposited on the light transmissive substrate 10, followed by the sacrificial layer 14, layers 18, 20 and the metal layer 22. The cross sections in FIGS. 1A to 1D and 3A to 3D are taken along substantially square mirrors in FIGS. 2 and 4 respectively. However, the mirrors need not be square but can have other shapes that may decrease diffraction and increase the contrast ratio. Such mirrors, the subject at least in part of the present invention, are disclosed further herein and in U.S. provisional patent application No. 60/229,246 to Ilkov et al., the subject matter of which is incorporated herein by reference.

Also, though the hinge of each mirror can be formed in the same plane as the mirror element (and/or formed as part of the same deposition step) as set forth above (see also FIGS. 20A to L), they can also be formed separated from and parallel to the mirror element in a different plane and as part of a separate processing step. This superimposed type of hinge is disclosed in FIGS. 8 and 9 of the previously-mentioned U.S. Pat. No. 6,046,840, and in more detail in U.S. patent application "A Deflectable Spatial Light Modulator Having Superimposed Hinge and Deflectable Element" to Huibers et al. filed Aug. 3, 2000, the subject matter of which being incorporated herein. Whether formed with one sacrificial layer as in the Figures, or two (or more) sacrificial layers as for the superimposed hinge, such sacrificial layers are removed as will be discussed below, with a preferably isotropic etchant. This "release" of the mirrors can be performed immediately following the above described steps, or after shipment from the foundry at the place of assembly.

Backplane

The second or "lower" substrate (the backplane) die contains a large array of electrodes on a top metal layer of the die. Each electrode electrostatically controls one pixel (one micromirror on the upper optically transmissive substrate) of the microdisplay. The voltage on each electrode on the surface of the backplane determines whether its corresponding microdisplay pixel is optically 'on' or 'off,' forming a visible image on the microdisplay. Details of the backplane and methods for producing a pulse-width-modulated grayscale or color image are disclosed in U.S. patent application Ser. No. 09/564,069 to Richards, the subject matter of which is incorporated herein by reference.

The display pixels themselves, in a preferred embodiment, are binary, always either fully 'on' or fully 'off,' and so the backplane design is purely digital. Though the micromirrors could be operated in analog mode, no analog capability is necessary. For ease of system design, the backplane's I/O and control logic preferably run at a voltage compatible with standard logic levels, e.g. 5V or 3.3V. To maximize the voltage available to drive the pixels, the backplane's array circuitry may run from a separate supply, preferably at a higher voltage.

One embodiment of the backplane can be fabricated in a foundry 5V logic process. The mirror electrodes can run at 0–5V or as high above 5V as reliability allows. The backplane could also be fabricated in a higher-voltage process such as a foundry Flash process using that process's high-voltage devices. The backplane could also be constructed in a high-voltage process with larger-geometry transistors capable of tolerating 12V or more. A higher voltage backplane can produce an electrode voltage swing significantly higher than the 5–7V that the lower voltage backplane provides, and thus actuate the pixels more robustly.

In digital mode, it is possible to set each electrode to either state (on/off), and have that state persist until the state of the electrode is written again. A RAM-like structure, with one bit per pixel is one architecture that accomplishes this. One example is an SRAM-based pixel cell. Alternate well-known storage elements such as latches or DRAM (pass transistor plus capacitor) are also possible. If a dynamic storage element (e.g. a DRAM-like cell) is used, it is desirable that it be shielded from incident light which might otherwise cause leakage.

The perception of a grayscale or full-color image will be produced by modulating pixels rapidly on and off, for example according to the method in the above-mentioned U.S. patent application Ser. No. 09/564,069 to Richards. In order to support this, it is preferable that the backplane allows the array to be written in random-access fashion, though finer granularity than a row-at-a-time is generally not necessary.

It is desirable to minimize power consumption, primarily for thermal reasons. Decreasing electrical power dissipation will increase the optical/thermal power budget, allowing the microdisplay to tolerate the heat of more powerful lamps. Also, depending upon the way the microdisplay is assembled (wafer-to-wafer join+offset saw), it may be preferable for all I/O pads to be on one side of the die. To minimize the cost of the finished device it is desirable to minimize pin count. For example, multiplexing row address or other infrequently-used control signals onto the data bus can eliminate separate pins for these functions with a negligible throughput penalty (a few percent, e.g. one clock cycle for address information per row of data is acceptable). A data bus, a clock, and a small number of control signals (5 or less) are all that is necessary.

In use, the die will be illuminated with a 200 W or more arc lamp. The thermal and photo-carrier effects of this may result in special layout efforts to make the metal layers as 'opaque' as possible over the active circuitry to reflect incident optical energy and minimize photocarrier and thermal effects. An on-chip PN diode could be included for measuring the temperature of the die.

In one embodiment the resolution is XGA, 1024×768 pixels, though other resolutions are possible. A pixel pitch of from 5 to 24 um is preferred (e.g. 14 um). The size of the electrode array itself is determined by the pixel pitch and resolution. A 14 um XGA device's pixel array will therefore be 14.336×10.752 mm.

Figure 5:
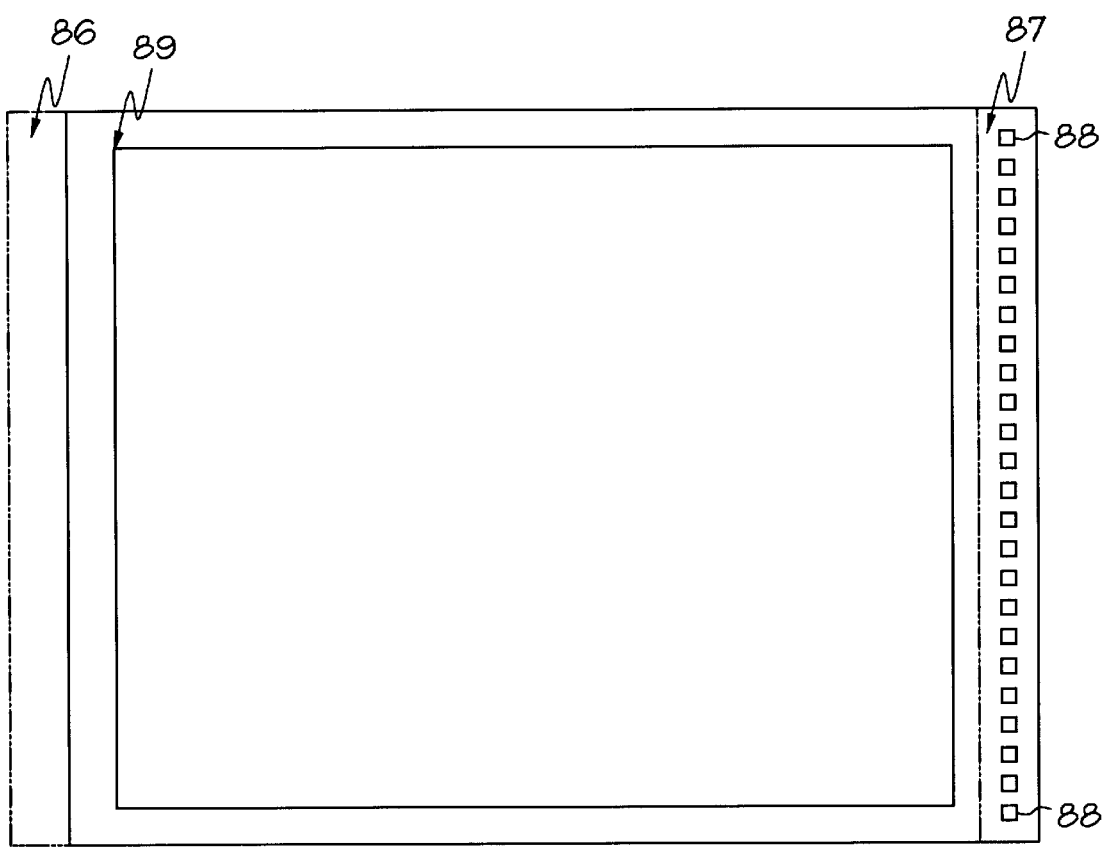
FIG. 5 is an illustration of the I/O pads and Si backplane for the mirror array of the present invention.

As can be seen in FIG. 5, the I/O pads (88) can be placed along the right side of the die, as the die is viewed with pixel (0,0) (89 in FIG.5) at the top left corner. Putting the pads on the 'short' (left/right) side (87) of the die is preferable due to the slightly reduced die size. The choice of whether the I/O should go on the left vs. right side of the die is of little importance since the display controller ASIC may support mirroring the displayed image in the horizontal axis, the vertical axis, or both. If it is desired to orient the display with the I/O on the left side, the image may simply be rotated 180 degrees by the external display controller. The electrode voltage during operation is, in the low state 0V and in the high state from 5 to 7 V (or 12V in the higher voltage design). In one embodiment the electrodes are metal squares, though other geometries are possible. Standard CMOS passivation stackup over the electrodes can be provided.

Assembly

After the upper and lower substrates (wafers) are finished being processed (e.g. circuitry/electrodes on lower wafer, micromirrors on upper wafer), the upper and lower wafers are joined together. The assembly of the wafers and separation of the wafer assembly into individual dies is similar in many respects to the method for assembly of a liquid crystal device as disclosed in U.S. Pat. No. 5,963,289 to Stefanov et al, "Asymmetrical Scribe and Separation Method of Manufacturing Liquid Crystal Devices on Silicon Wafers", which is hereby incorporated by reference. Whether the upper and lower wafer are made of the same or different materials (silicon, glass, dielectric, multilayer wafer, etc.), they can first be inspected for for visual defects, scratches, particles, etc.—After inspection, the wafers can be processed through industry standard cleaning processes. These include scrubbing, brushing or ultrasonic cleaning in a solvent, surfactant solution, and/or de-ionized (DI) water.

If the mirrors on the upper wafer have not been released, they should be released at this point. Releasing immediately prior to the application of epoxy or bonding is preferable (except for an optional stiction treatment between release and bonding). For silicon sacrificial layers, the release is in an atmosphere of xenon difluoride and an optional diluent (e.g. nitrogen and/or helium). Of course, other etchants could be used, including interhalogens such as bromine trifluoride and bromine trichloride. The release is preferably a spontaneous chemical etch which does not require plasma or other external energy to etch the silicon sacrificial layer(s). After etching, the remainder of the device is treated for stiction by applying an anti-stiction layer (e.g. a self assembled monolayer). The layer is preferably formed by placing the device in a liquid or gas silane, preferably a halosilane, and most preferably a chlorosilane. Of course, many different silanes are known in the art for their ability to provide anti-stiction for MEMS structures.

In order to bond the two wafers together, spacers are mixed into sealant material. Spacers in the form of spheres or rods are typically dispensed and dispersed between the wafers to provide cell gap control and uniformity and space for mirror deflection. Spacers can be dispensed in the gasket area of the display and therefore mixed into the gasket seal material prior to seal dispensing. This is achieved through normal agitated mixing processes. The final target for the gap between the upper and lower wafers is preferably from 1 to 10 um. This of course depends upon the type of MEMS structure being encapsulated and whether it was surface or bulk micromachined. The spheres or rods can be made of glass or plastic, preferably an elastically deforming material. Alternatively, spacer pillars can be fabricated on at least one of the substrates. In one embodiment, pillars/spacers are provided only at the side of the array. In another embodiment, pillars/spacers can be fabricated in the array itself. Other bonding agents with or without spacers could be used, including anodic bonding or metal compression bonding with a patterned eutectic.

A gasket seal material can be dispensed on the bottom substrate in a desired pattern, usually in one of two industry standard methods including automated controlled liquid dispensing through a syringe and printing (screen, offset, or roller). When using a syringe, it is moved along X-Y coordinates relative to the parts. The syringe tip is constrained to be just above the part with the gasket material forced through the needle by positive pressure. Positive pressure is provided either by a mechanical plunger forced by a gear driven configuration and/or by an air piston and/or pressed through the use of an auger. This dispensing method provides the highest resolution and process control but provides less throughput.

In one specific embodiment, the glass substrate is aligned with the silicon substrate. Alignment of the opposing electrodes or active viewing areas requires registration of substrate fiducials on opposite substrates. This task is usually accomplished with the aid of video cameras with lens magnification. The machines range in complexity from manual to fully automated with pattern recognition capability. Whatever the level of sophistication, they accomplish the following process: 1. Dispense a very small amount of a UV curable adhesive at locations near the perimeter and off of all functional devices in the array; 2. Align the fiducials of the opposing substrates within the equipment capability; and 3. Press substrates and UV tack for fixing the wafer to wafer alignment through the remaining bonding process (e.g., curing of the internal epoxy).

The final cell gap can be set by pressing the previously tacked laminates in a UV or thermal press. In a UV press, a common procedure would have the substrates loaded into a press where at least one or both of the press platens are quartz, in order to allow UV radiation from a UV lamp to pass unabated to the gasket seal epoxy. Exposure time and flux rates are process parameters determined by the equipment and adhesive materials. Thermally cured epoxies require that the top and bottom platens of a thermal press be heated. The force that can be generated between the press platens is typically many tons. With thermally cured epoxies, after the initial press the arrays are typically transferred to a stacked press fixture where they can continue to be pressed and post-cured for 4–8 hours.

Once the wafers have been bonded together to form a wafer assembly, the assembly can be separated into individual dies. Silicon substrate and glass scribes are placed on the respective substrates in an offset relationship at least along one direction. The units are then separated, resulting in each unit having a bond pad Iside on one side and a glass electrical contact Iside on an opposite side. The parts may be separated from the array by any of the following methods. The order in which the array (glass first) substrate is scribed is important when conventional solid state cameras are used for viewing and alignment in a scribe machine. This constraint exists unless special infrared viewing cameras are installed which make the silicon transparent and therefore permits viewing of front surface metal fiducials. The scribe tool is aligned with the scribe fiducials and processed. The resultant scribe lines in the glass arc used as reference marks to align the silicon substrate scribe lanes. These scribe lanes may be coincident with the glass substrate scribes or uniformly offset. The parts are then separated from the array by venting the scribes on both substrates. Automatic breaking is done by commercially available guillotine or fulcrum breaking machines. The parts can also be separated by hand.

Separation may also by done by glass scribing and partial sawing of the silicon substrate. Sawing requires an additional step at gasket dispense. Sawing is done in the presence of a high-pressure jet of water. Moisture must not be allowed in the area of the fill port or contamination of the polyimide alignment layer will occur. Therefore, at gasket dispense, an additional gasket bead must be dispensed around the perimeter of the wafer. The end of each scribe/saw lane must be initially left open, to let air vent during the align and press processes. After the array has been pressed and the gasket material cured, the vents are then closed using either the gasket or end-seal material. The glass is then aligned and scribed as described above. Sawing of the wafer is done from the backside of the silicon where the saw streets are aligned relative to the glass scribe lanes described above. The wafer is then sawed to a depth of 50%–90% of its thickness. The parts are then separated as described above.

Alternatively, both the glass and silicon substrates may be partially sawed prior to part separation. With the same gasket seal configuration, vent and seal processes as described above, saw lanes are aligned to fiducials on the glass substrates. The glass is sawed to a depth between 50% and 95% of its thickness. The silicon substrate is sawed and the parts separated as described above.

Mirrors

The mirrors of the present invention can be provided in an array for optical switching. The optical switch could be a typical switch with one or more fiber optic inputs and a plurality of fiber optic outputs, with one or more mirrors for switching the input light beam(s) to one of the outputs. The mirrors of the present invention could also be used as part of a beam scanner. These and other applications are disclosed in U.S. patent application Ser. No. 09/617,149 to Huibers et al., the subject matter of which being incorporated herein by reference.

Figure 6:
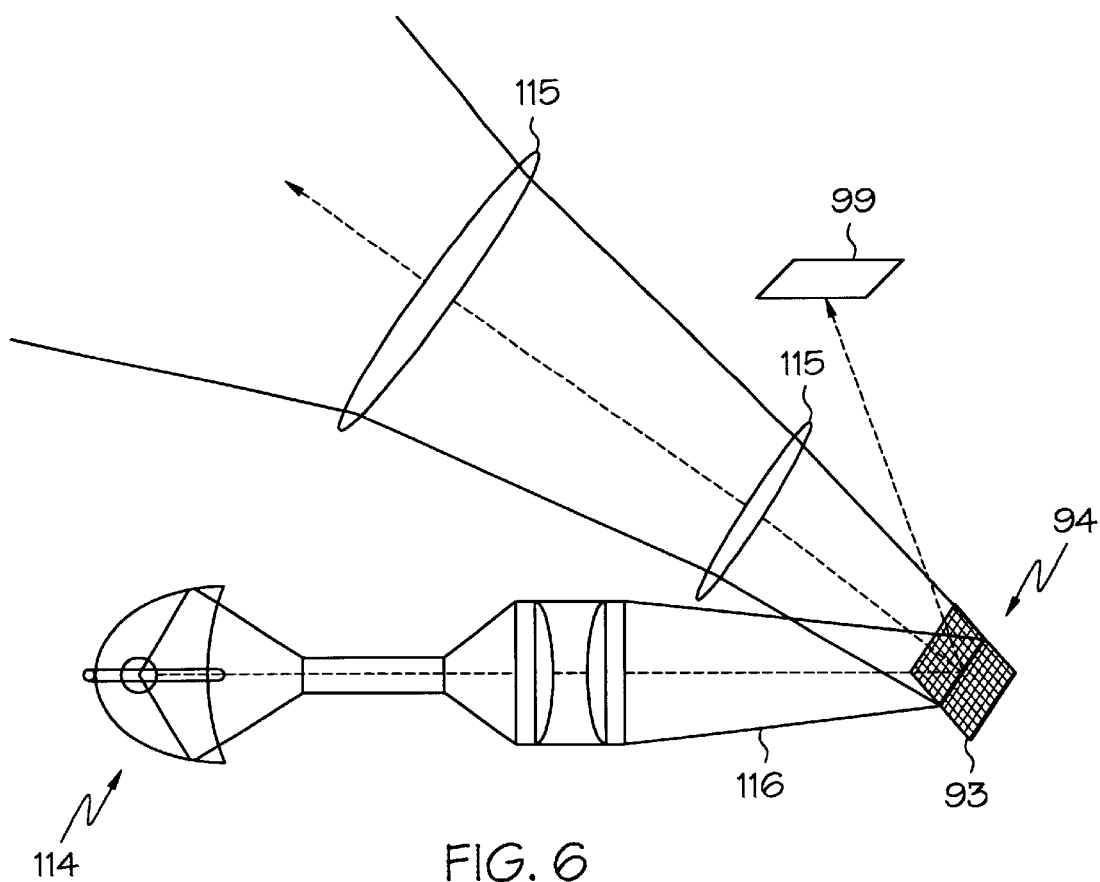
FIG. 6 is an illustration of the illumination system for the micromirror array of the present invention.

If, however, the mirrors of the present invention are for a projection display, there should be a suitable light source that illuminates the array and projects the image via projection optics to a target. The arrangement of light source and incident light beam to the array, and to each mirror, which allows for the improved contrast ratio in the present invention, can be seen in FIGS. 6 and 7. As can be seen in FIG. 6, a light source 114 directs a beam of light 116 at a 90 degree angle to the leading side 93 of the active area of the array (the active area of the array illustrated as rectangle 94 in the figure). The active area 94 would typically have from 64,000 to about 2,000,000 pixels in a usually rectangular array such as illustrated in FIG. 6. The active area 94 reflects light (via on-state mirrors) through optics 115 to a target to form a corresponding rectangular image on the target (e.g. wall or screen). Of course, the array could be a shape other than rectangular and would result in a corresponding shape on the target (unless passed through a mask). Light from light source 114 reflects off of particular mirrors (those in the on-state) in the array, and passes through optics 115 (simplified as two lenses for clarity). Mirrors in their off-state (in a non-deflected "rest" state), direct light to area 99 in FIG. 6.

Figure 7A:
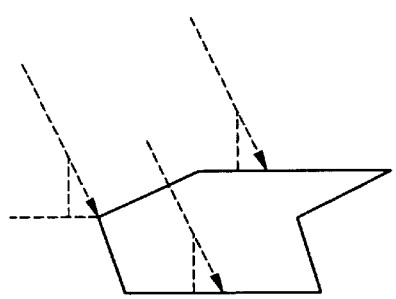
FIGS. 7A to 7E illustrate the relationship between angle of incident light, mirror sides, and active area sides.
Figure 7B:
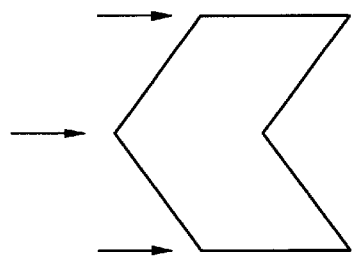
Figure 7C:
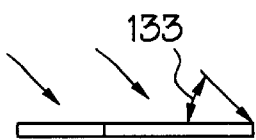

Whether the viewed image is on a computer, television or movie screen, the pixels on the screen image (each pixel on the viewed or projected image corresponding to a mirror element in the array) have sides which are not parallel to at least two of the four sides defining the rectangular screen image. As can be seen in one example of a mirror element in FIGS. 7 A–C, the incident light beam does not impinge perpendicularly on any sides of the mirror element. FIG. 7A is a perspective view of light hitting a single mirror element, whereas FIG. 7B is a top view and FIG. 7C is a side view. The incident light beam may be from 10 to 50 degrees (e.g. 20 degrees) from normal (to the mirror/array plane). See angle 133 in FIG. 7C.

Figure 7D:
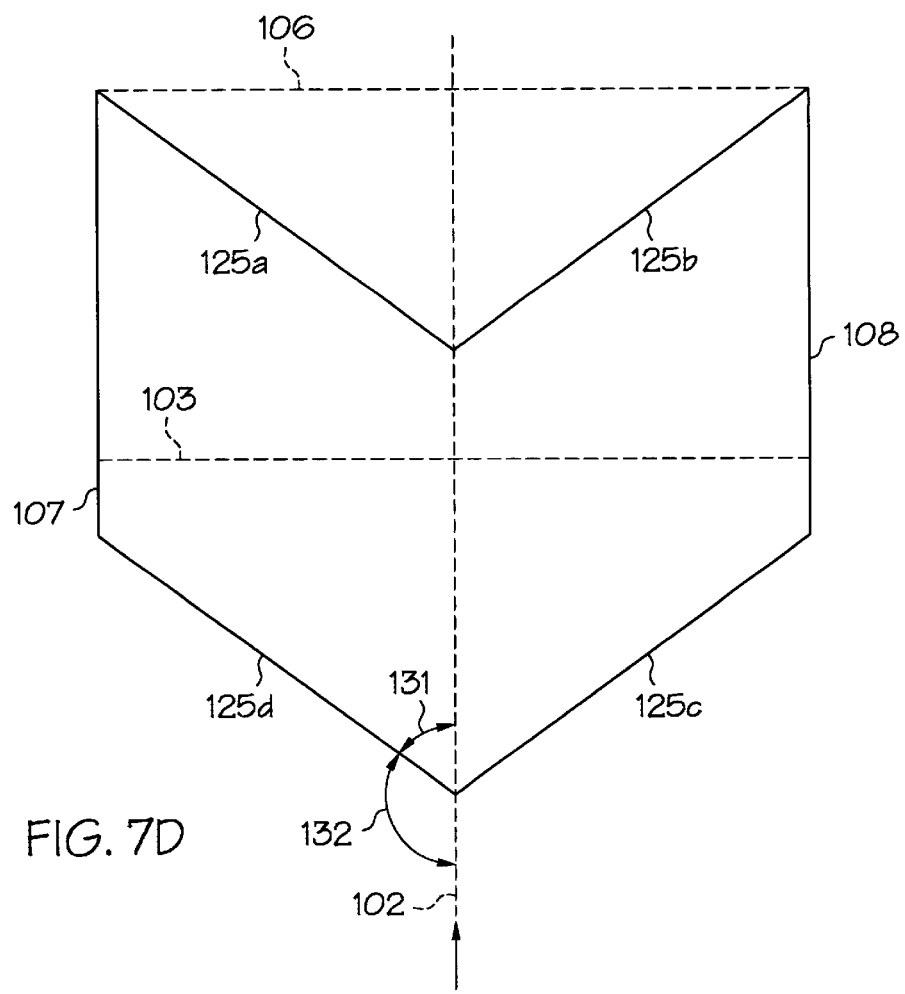
Figure 7E:
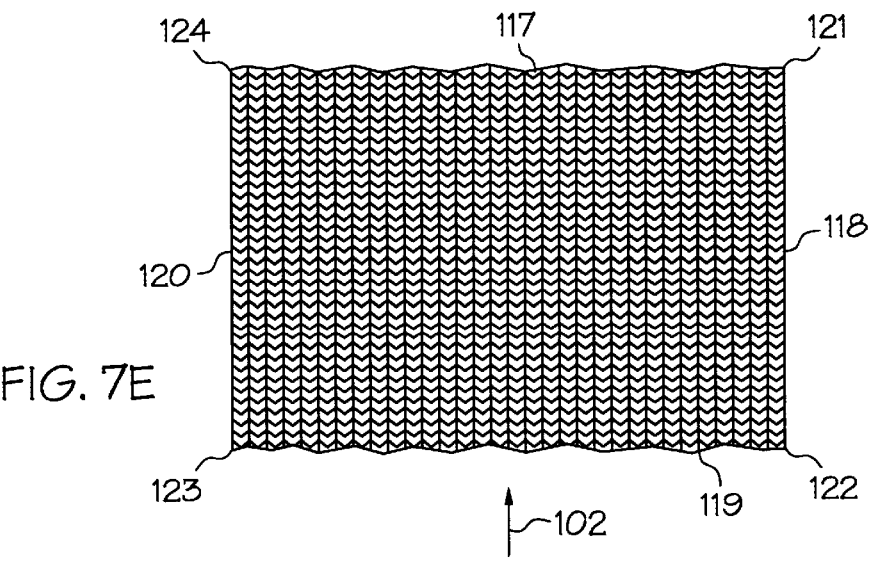

Regardless of the angle of the incident light beam from the plane of the mirror, no mirror sides will be perpendicular to the light beam incident thereon (see FIG. 7D). In a preferred embodiment, the mirror sides should be disposed at an angle (131) less than 80 degrees or preferably 55 degree or less in relation to the incident light beam axis projection on the mirror plane (102), more preferably 45 degrees or less, and most preferably 40 degrees or less. Conversely, angle 132 should be 100 degrees or more, preferably 125 degrees or more, more preferably 135 degrees or more, and most preferably 140 degrees or more. The switching (i.e., rotational) axis of the mirror is labeled as dotted line 103 in FIG. 7D. This switching axis could be in other places along the mirror, e.g. line 106, depending upon the type of hinges utilized. As can be seen in FIG. 7D, the switching axis (e.g. 103 or 106) is perpendicular to the incident light beam 102 as projected onto the plane of the mirror. FIG. 7E, like 7D, is a top view—however an array of mirrors are illustrated in FIG. 7E along with an incident light beam 102 onto the 2-D array of mirrors. Note that each mirror in FIG. 7E has the shape of the mirror illustrated in FIGS. 7A–D. As can be seen in FIG. 7E, the overall shape of the mirror array is a rectangle. Each of the four sides of the array, 117–120, is defined by drawing a line between the most remote pixels in the last row and column of the active area (121–124) (e.g. side 119 being defined by a line intersecting corner pixels 123 and 122). Though it can be seen in FIG. 7E that each of the "leading" (closest to the light source) and "trailing" (furthest from the light source) active area sides 119, 117 is "jagged" due to the shape of the mirrors in the active area, it should be remembered that there could be up to about 3,000,000 mirrors or more in an area of from 1 cm$^2$ to 1 in$^2$. Therefore, unless under extreme magnification, the active area will be essentially rectangular, with active area sides 118 and 120 (or 117 and 119) parallel to mirror sides 107 and 108 in FIG. 7D (the mirror in FIG. 7D being one of the mirror elements within the active area of FIG. 7E); with active area sides 117 and 119 (or 118 and 120) being parallel to the switching axis 103 (or 106) of each mirror (see FIG. 7D); and with active area sides 117 and 119 (or 118 and 120) being non-perpendicular to leading or trailing sides 125a–d of the mirrors (see FIG. 7D). FIG. 7E could also be seen as the projected image comprising a large number of projected pixels (each projected pixel having the shape illustrated in FIG. 7D). In accordance with the above, therefore, the projected image sides 118 and 120 (or 117 and 119) are parallel to projected pixel sides 107 and 108, and projected image sides 117 and 119 (or 118 and 120) being non-perpendicular to projected pixel sides 125a–d.

Figure 8:
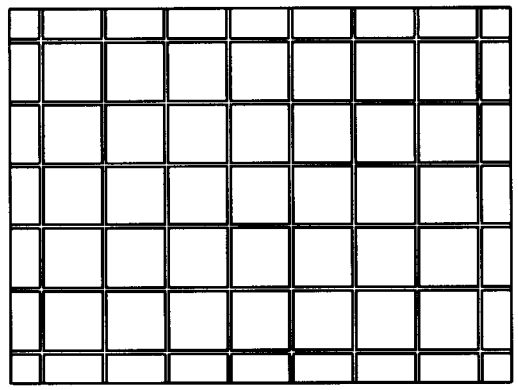
FIG. 8 is an illustration of a prior art mirror array.
Figure 9:
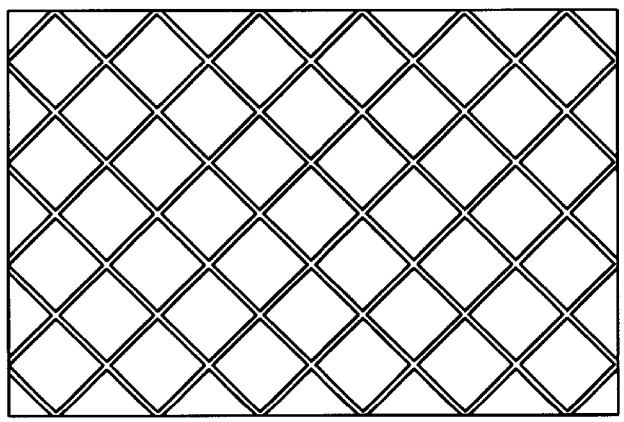
FIGS. 9 and 10 are illustrations of an embodiment of the invention where square mirrors are at an angle to the active area sides.

FIG. 8 is an illustration of a 2-D mirror array (of course with many fewer pixels than within the typical active area). For ease of illustration (in FIG. 8 as well as FIGS. 9–14 and 17–19) fewer than 60 mirrors/pixels are illustrated, though a typical display would have from 64K pixels (320×200 pixels) to 1,920K pixels (1600×1200 pixels=UXGA), or higher (e.g. 1920×1080=HDTV; 2048×1536=QXGA). Due to the very small size of each pixel in the present invention, the resolution that can be achieved is essentially without limit. As can be seen in FIG. 8, the sides of each pixel are parallel to corresponding sides of the active area. Thus, each mirror side is either perpendicular or parallel to the sides of the active area. In contrast, as illustrated in FIG. 9, the mirror sides are neither parallel nor perpendicular to the active area sides. As will be seen below, in other embodiments, some of the sides are neither parallel nor perpendicular to active area sides, and some sides can be parallel to active area sides (as long as also parallel to the direction of a line superimposed on the plane of the mirror from the incident light beam).

Figure 10:
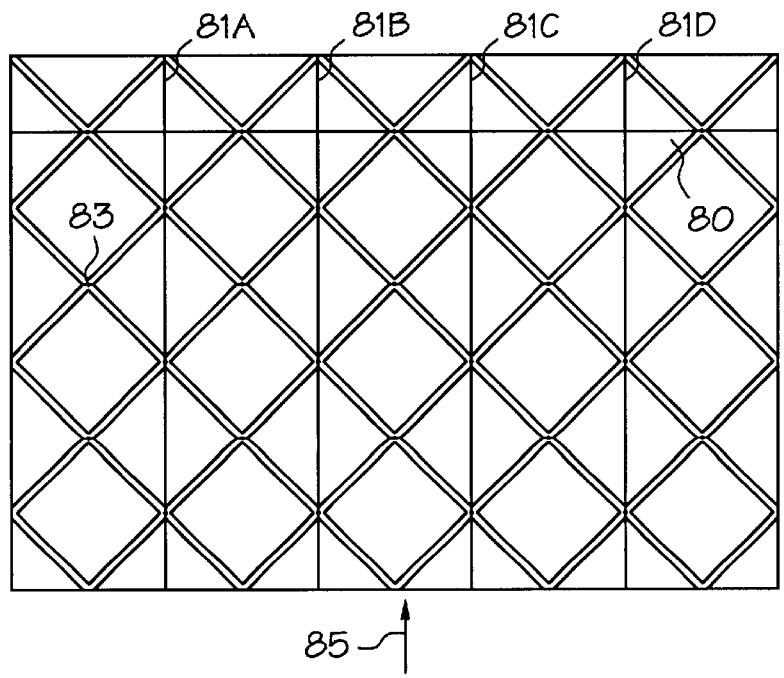

The mirror array as illustrated in FIG. 9 achieves higher contrast ratio. However, the mirror arrangements such as illustrated in FIGS. 11–18 simplify the addressing scheme. More particularly, FIGS. 11–18 have the advantage of not positioning the pixels on a lattice aligned at an angle to the X and Y axes of the array. As typical video image sources provide pixel color data in an X-Y grid, the arrangement of pixels in FIGS. 11–18 avoids non-trivial video preprocessing to render an acceptable image on a display. Also the arrangement of FIGS. 11–18 avoids a more complicated layout of the display backplane (in relation to FIGS. 9 and 10, which could require twice as many row or column wires to the pixel controller cells). Horizontal line 80 in FIG. 10 connects the top row of mirror elements, and vertical lines 81A–D extend from each of these top row mirrors (these horizontal and vertical lines corresponding to addressing rows and columns in the array). As can be seen in FIG. 10, only every other mirror is connected in this way. Thus, in order for all mirrors to be addressed, twice as many rows and columns are needed, thus resulting in added complexity in addressing the array. FIG. 10 also shows support posts 83 at the corners of the mirrors that support posts connect to hinges (not shown) below each mirror element (the "superimposed hinges" discussed hereinabove) and to an optically transmissive substrate (not shown) above the mirror elements.

Figure 11:
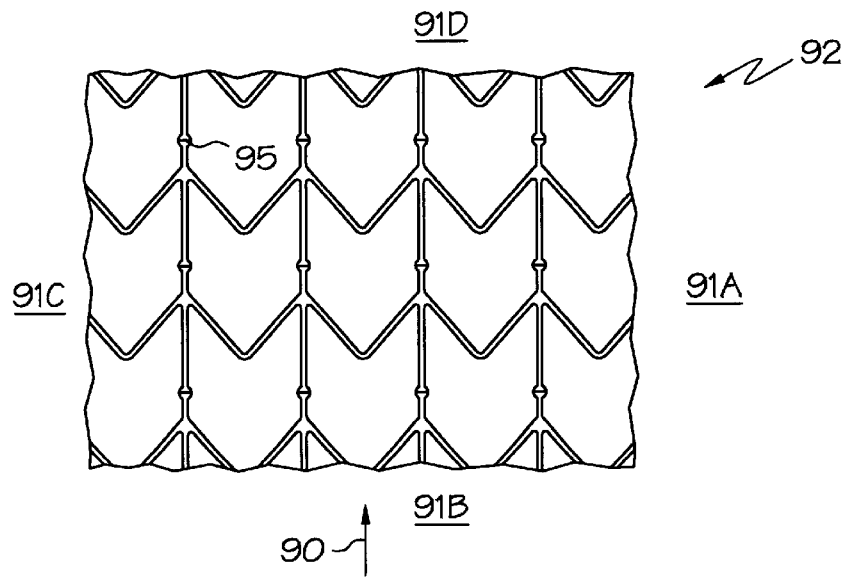
FIGS. 11 to 16 are illustrations of mirrors having the shapes of one or more parallelograms.

In a more preferred embodiment of the invention as shown in FIG. 11, an array 92 is provided. A light beam 90 is directed at the array such that no mirror sides are perpendicular to the incident light beam. In FIG. 11, the leading sides of the mirrors (relative to incident light beam 90) are at an angle of about 135 degrees to the incident light beam (90). It is preferred that this angle be greater than 100 degrees, preferably greater than 130 degrees. The contrast ratio is further improved if the angle between the incident light beam and the leading side is 135 degrees or more, and can even be 140 degrees or more. As can be seen in FIG. 11, the mirror elements' orientation does not result in addressing issues as discussed above with respect to FIG. 10. Posts 95 connect to hinges (not shown) below each mirror element in FIG. 11. The hinges extend perpendicularly to the direction of the incident light beam (and parallel to the leading and trailing sides 91B and 91D of the active areas). The hinges allow for an axis of rotation of the mirrors that is perpendicular to the incident light beam.

Figure 12:
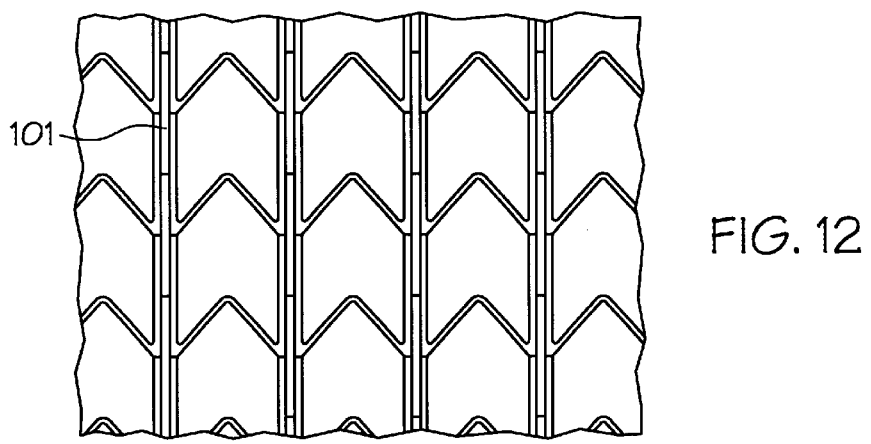
Figure 13:
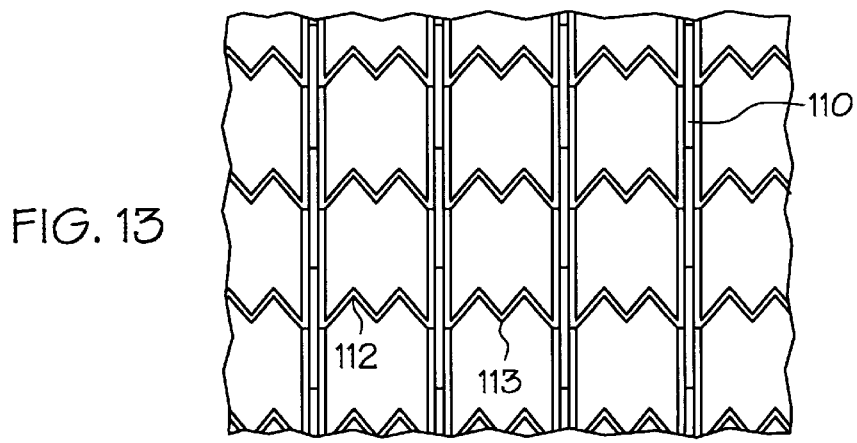
Figure 14A:
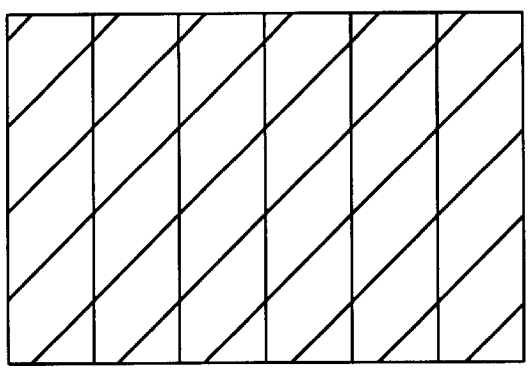
Figure 14B:
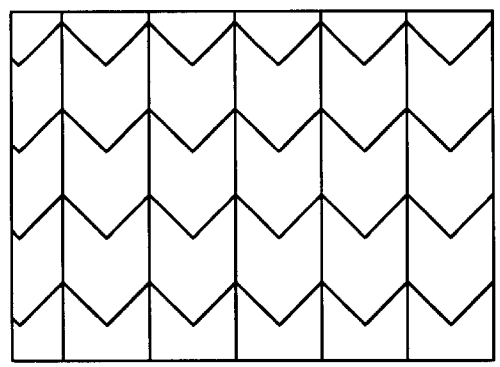
Figure 14C:
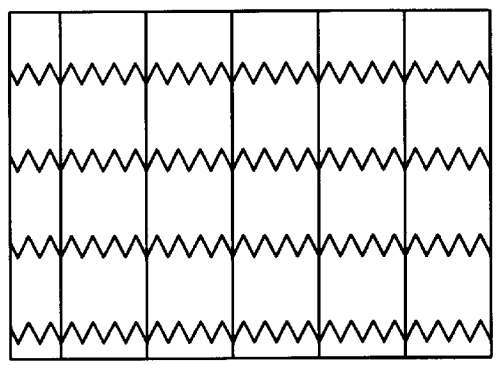
Figure 14D:
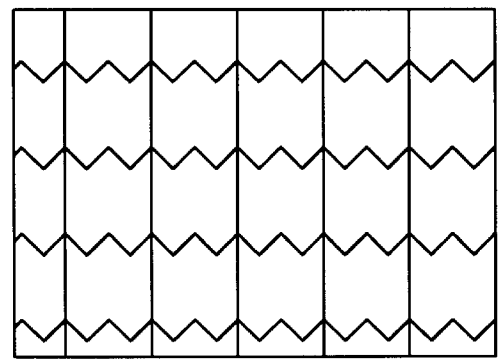
Figure 14E:
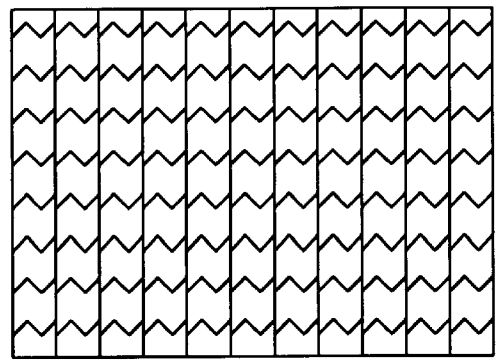
Figure 14F:
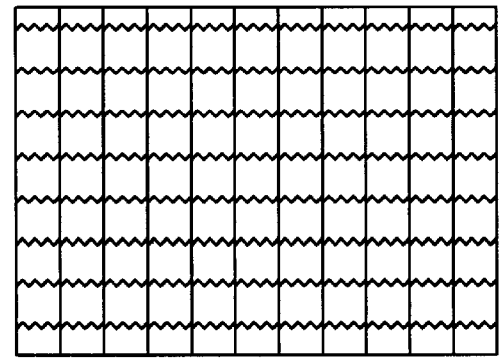

FIG. 12 is an illustration of mirrors similar to that shown in FIG. 11. In FIG. 12, however, the mirror elements are "reversed" and have their "concave" portion as their leading side. Even though the mirrors in FIG. 12 are reversed from that shown in FIG. 11, there are still no sides of the mirrors that are perpendicular to the incident light beam. FIG. 12 illustrates a hinge 101 disposed in the same plane as the mirror element to which the hinge is attached. Both types of hinges are disclosed in the '840 patent mentioned above. FIG. 13 likewise illustrates a hinge 110 in the same plane as the mirror array, and shows both "convex" portions 112 ("protrusions") and "concave" portions 113 ("cut-outs") on the leading side of each mirror. Due to the concave or cut-out portion of each mirror, each mirror is in a shape of a concave polygon. Though the mirrors can be convex polygons (if no sides of the convex polygonal mirrors are parallel to the leading side of the active area), it is preferred that the mirrors have a concave polygon shape. Convex polygons are known as polygons where no line containing a side can go through the interior of the polygon. A polygon is concave if and only if it is not a convex polygon. The concave polygon shape can be in the form of a series of (non-rectangular) parallelograms, or with at least one concave and a matching at least one convex portion (for fitting within the concave portion of the adjacent mirror), though any concave polygon shape is possible. Though less preferred, as mentioned above, the mirror shape could also be that of a single (non-rectangular) parallelogram. Though not illustrated, the matching one or more protrusions and one or more cut-outs need not be composed of straight lines (nor any of the mirror sides for that matter), but instead could be curved. In one such embodiment, the protrusion(s) and cut-out(s) are semicircular, though the illustrated angular protrusions and cut-outs are preferred.

Figure 17:
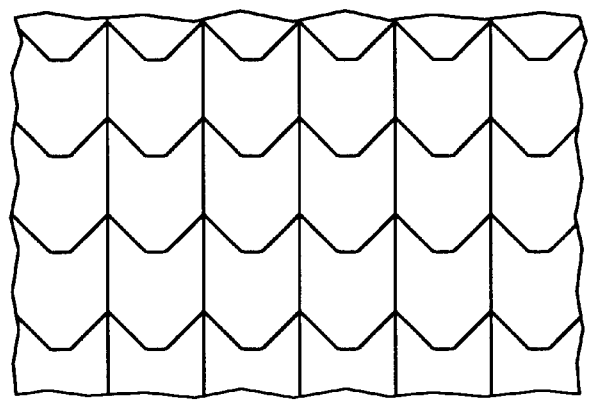
FIG. 17 is an illustration of a mirror array having part of the leading and trailing sides perpendicular to the incident light beam, and another part at a 45 degree angle to the incident light beam.

FIGS. 14A to 14F illustrate further embodiments of the invention. Though the shape of the mirrors are different in each figure, each is the same in that none has any sides perpendicular to the incident light beam. Of course, when a mirror side changes direction, there is a point, however small, where the side could be considered perpendicular, if only instantaneously. However, when it is stated that there are no sides perpendicular, it is meant that there are no substantial portions which are perpendicular, or at least no such substantial portions on the leading side and trailing side of the mirrors. Even if the direction of the leading sides changed gradually (or a portion of the leading side is perpendicular to the incident light beam, such as illustrated in FIG.17), it is preferred that there would never be more than 1/2 of the leading side that is perpendicular to the incident light beam, more preferably no more than 1/4, and most preferably 1/10 or less. The lower the portion of the leading side and trailing side that is perpendicular to the incident light beam, the greater the improvement in contrast ratio.

Figure 15A:
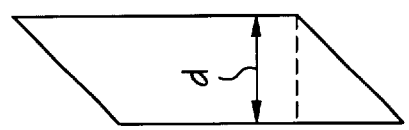
Figure 15B:
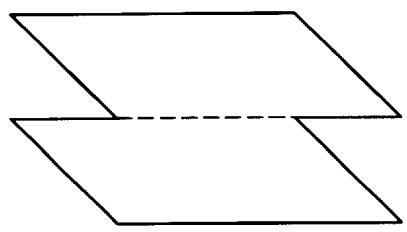
Figure 15C:
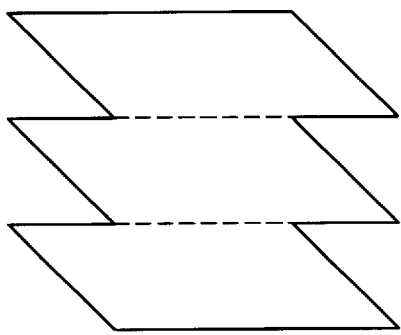
Figure 15D:
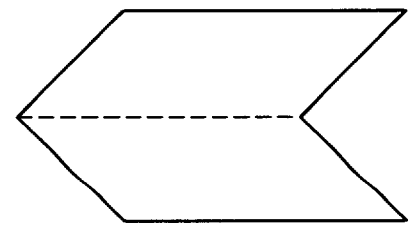
Figure 15E:
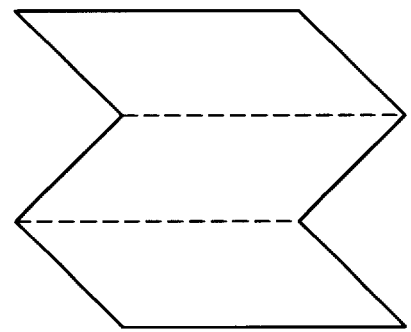
Figure 15F:
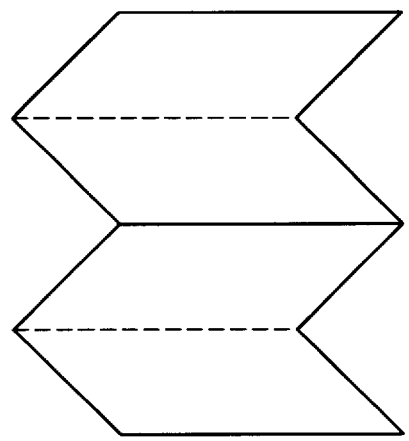

Many of the mirror embodiments can be viewed as an assembly of one or more parallelograms (e.g. identical parallelograms). As can be seen in FIG. 15A, a single parallelogram is effective for decreasing light diffraction as it has no sides perpendicular to the incident light beam (the light beam having a direction from the bottom to the top of the page and starting from out of the plane of the page). FIG. 15A illustrates a single parallelogram with a horizontal arrow indicating width "d" of the parallelogram. The switching axis for the mirror in FIG. 15A (and FIGS. 15B to 15F) is also in this horizontal direction. For example, the switching axis could be along the dotted line in FIG. 15A. FIGS. 15B and 15C show both two and three parallelogram mirror designs, where each subsequent parallelogram has the same shape, size and appearance as the one before. This arrangement forms a "saw-tooth" leading and trailing side of the mirror element. FIGS. 15D to 15F illustrate from 2 to 4 parallelograms. However, in FIGS. 15D to 15F, each subsequent parallelogram is a mirror image of the one before, rather than the same image. This arrangement forms a "jagged side" on the leading and trailing sides of the mirror elements. It should be noted that the parallelograms need not each be of the same width, and a line connecting the tips of the saw-tooth or jagged sides need not be perpendicular to the incident light beam. The width of each parallelogram, if they are constructed to be of the same width, will be d=M/N, where M is total mirror width, N is the number of parallelograms. With an increasing number of parallelograms, the width d is decreasing (assuming constant mirror width). However, width d should preferably be much larger than the wavelength of the incident light. In order to keep the contrast ratio high, the number of parallelograms N (or the number of times the leading mirror side changes direction) should be less than or equal to $0.5 M/\lambda$, or preferably less than or equal to $0.2 M/\lambda$, and even less than or equal to $0.1 M/\lambda$, where $\lambda$ is the wavelength of the incident light. Though the number of parallelograms are anywhere from 1 to 4 in FIG. 15, any number are possible, though 15 or fewer, and preferably 10 or fewer result in better contrast ratio. The number in FIG. 15 is most preferred (4 or fewer).

Figure 16:
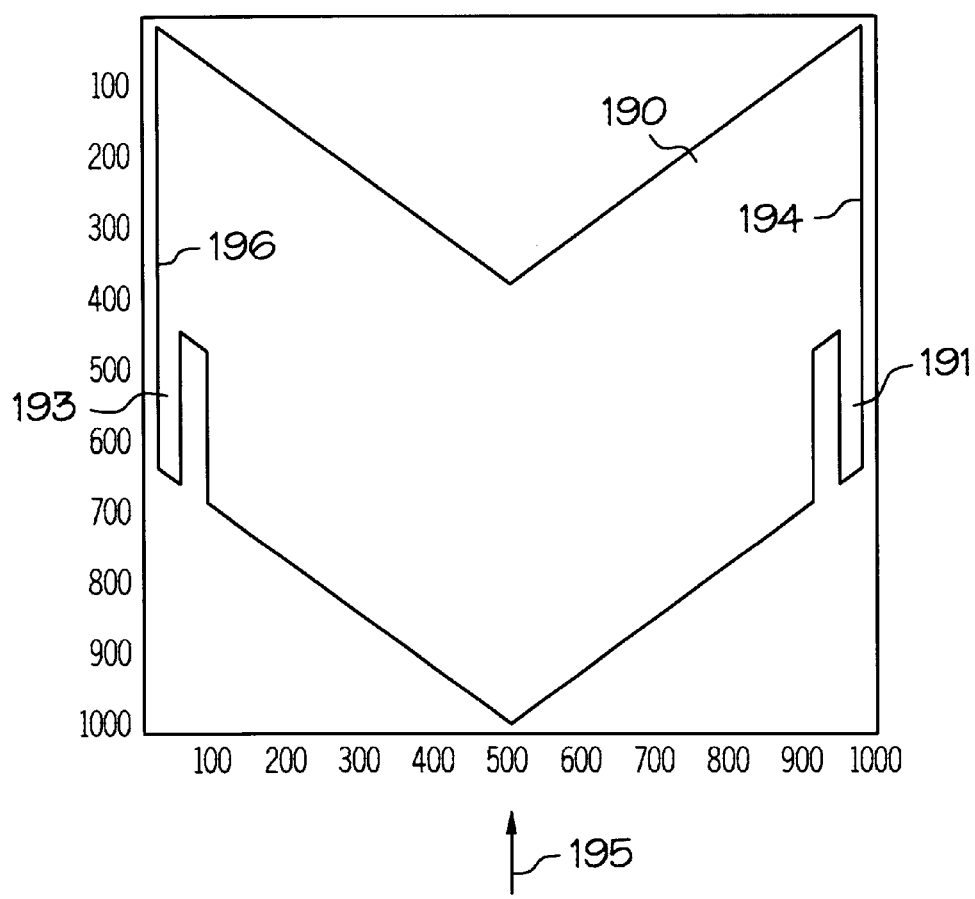

As can be seen in FIG. 16, hinges (or flexures) 191, 193 are disposed in the same plane as mirror element 190. Incident light beam 195 from a light source out of the plane of FIG.16 impinges on leading sides of mirror 190, none of which are perpendicular. It is preferred that no portion of the hinges be perpendicular to the incident light beam, so as to decrease light diffraction in direction of mirror switching.

Figure 18:
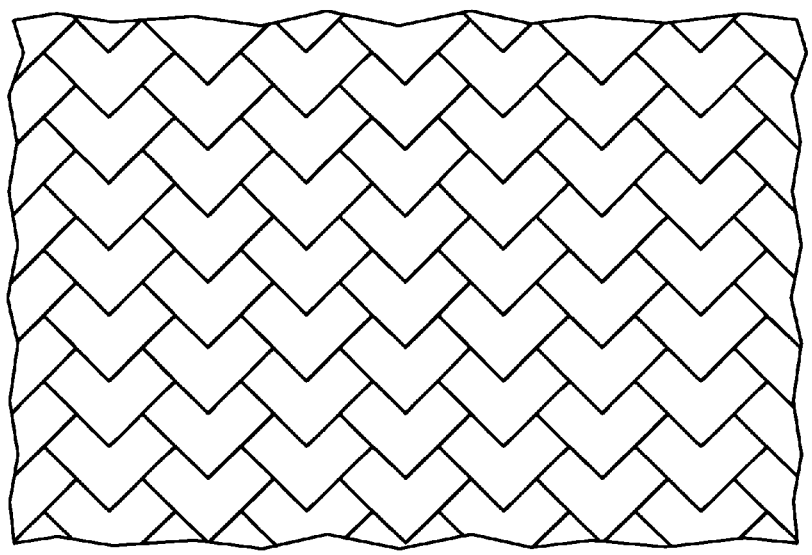
FIGS. 18 and 19 are illustrations of mirror arrays where the mirrors have no sides parallel or perpendicular to the incident light beam or the sides of the active area of the array.
Figure 19:
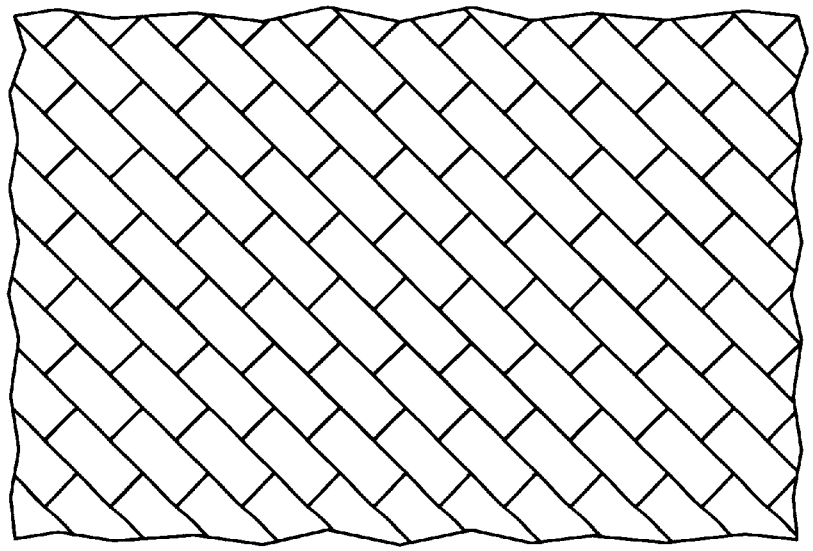

Also, it should be noted that the "straight" mirror sides that are illustrated as being parallel to active area sides (e.g. mirror sides 194, 196 in FIG. 16) can have other shapes as well. FIG. 10 above is one example where there are no mirror sides parallel to incident light beam 85. FIGS. 18 and 19 are further examples where no mirror sides are perpendicular or parallel to the incident light beam, yet do not have the increased addressing complexity as that of FIG. 10. Incident light can be directed substantially perpendicularly to any of the four active area sides in FIG. 18 (see arrows 1–4) and not be incident perpendicularly on any mirror sides. This unique feature is also present in the array illustrated in FIG. 19.

Figure 20A:
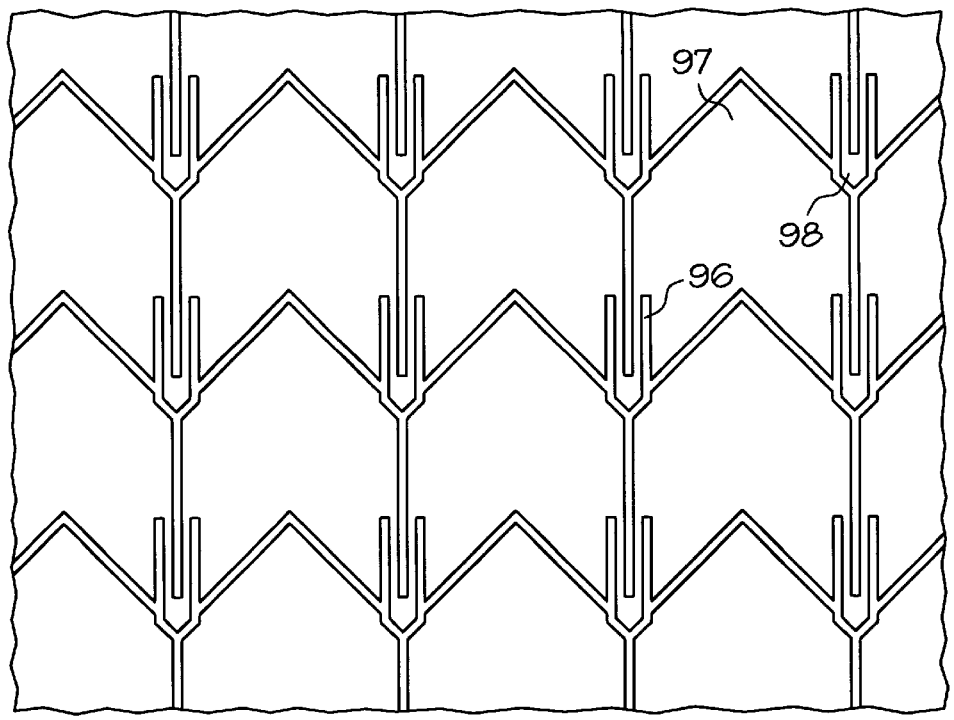
FIGS. 20A to 20L are illustrations of mirrors with corresponding hinge structures.
Figure 20B:
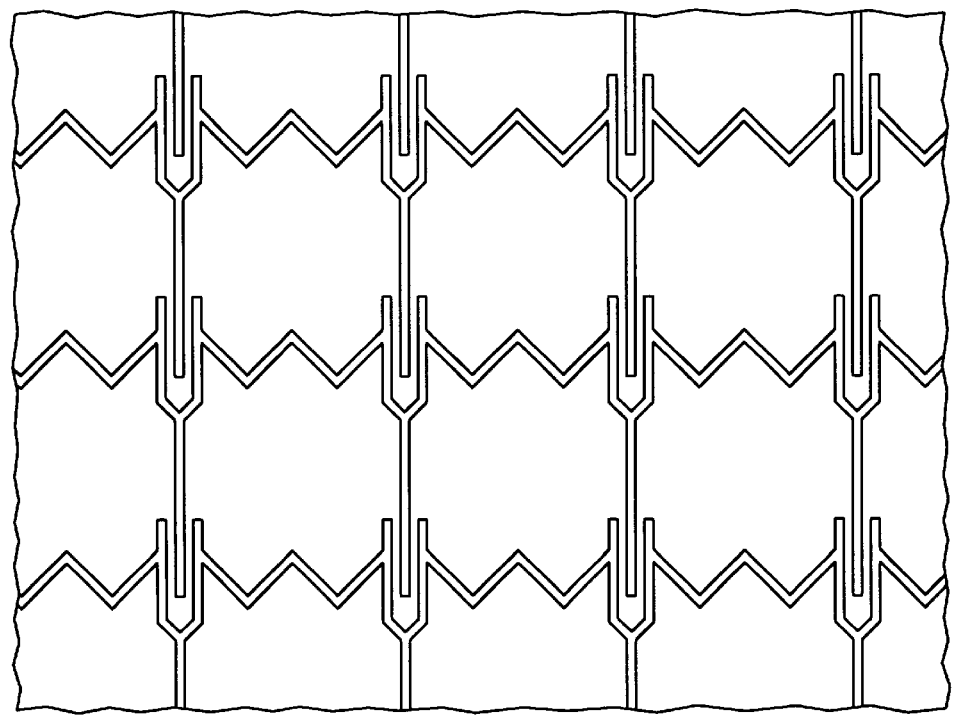
Figure 20C:
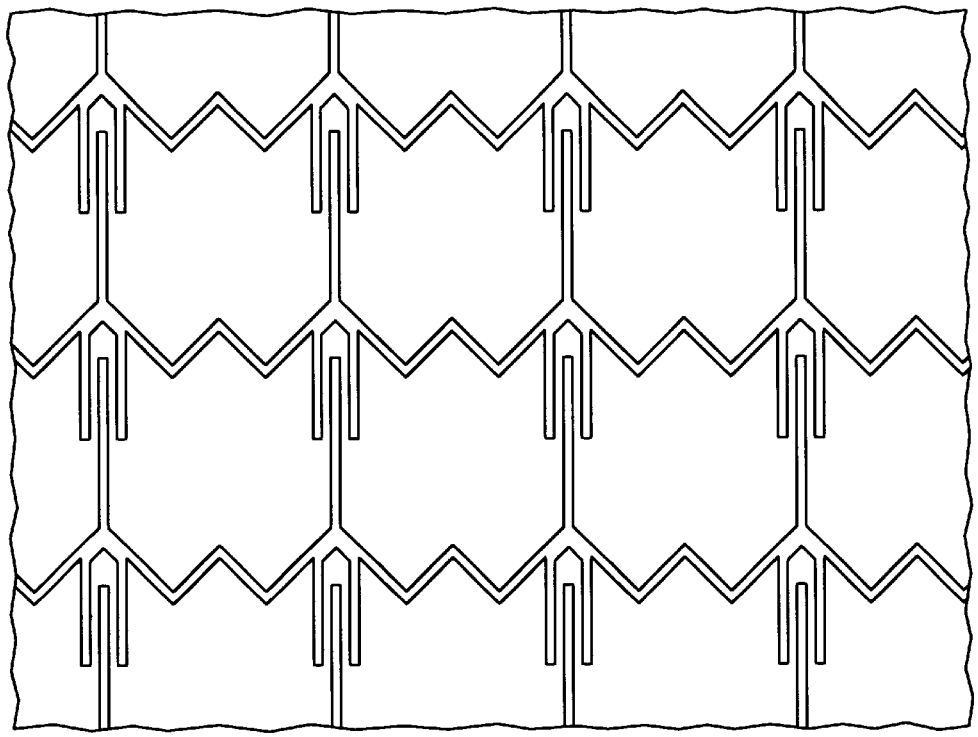
Figure 20D:
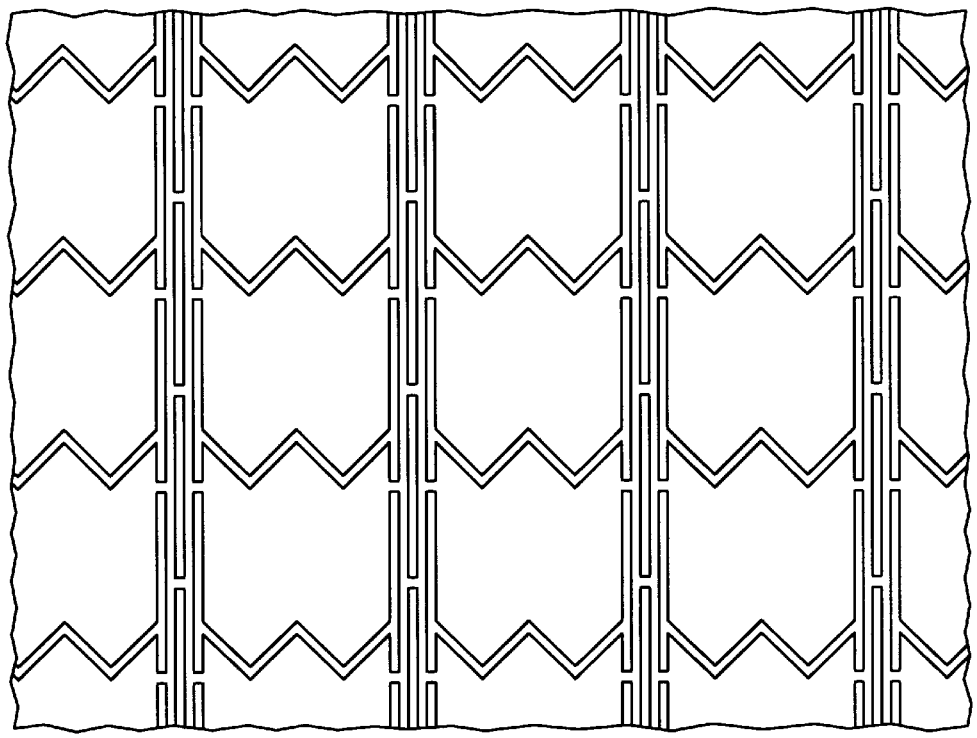
Figure 20E:
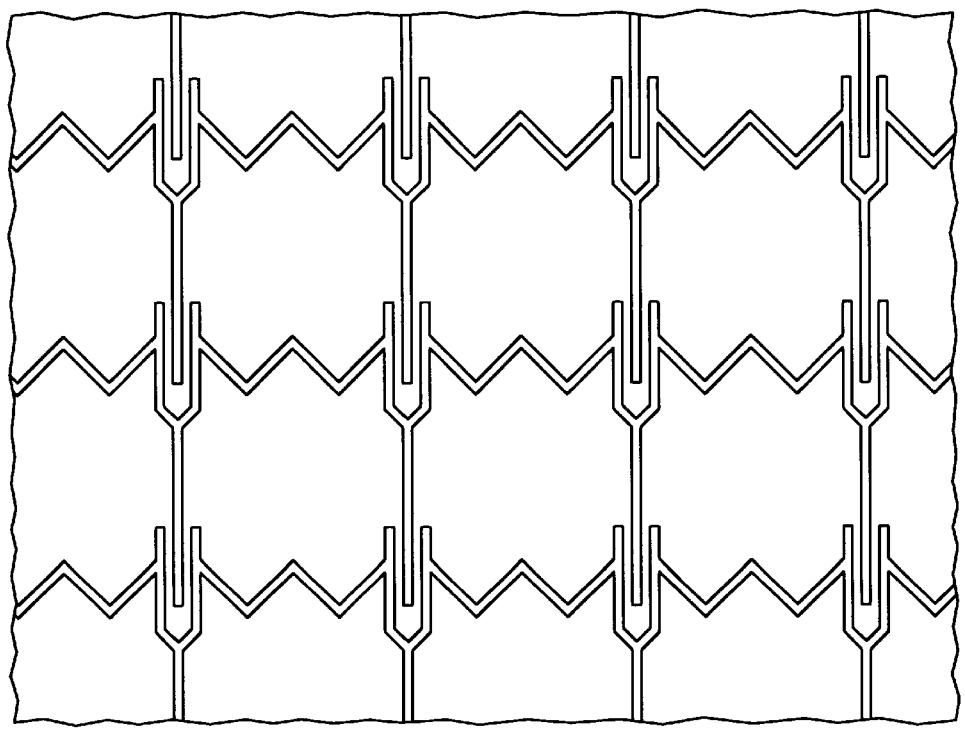
Figure 20F:
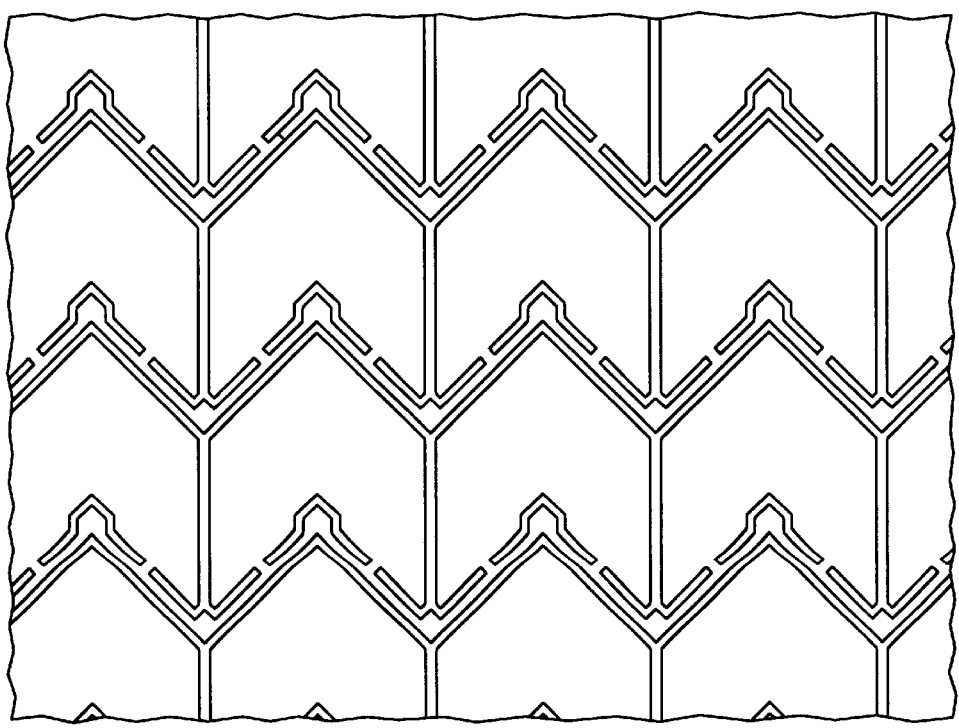
Figure 20G:
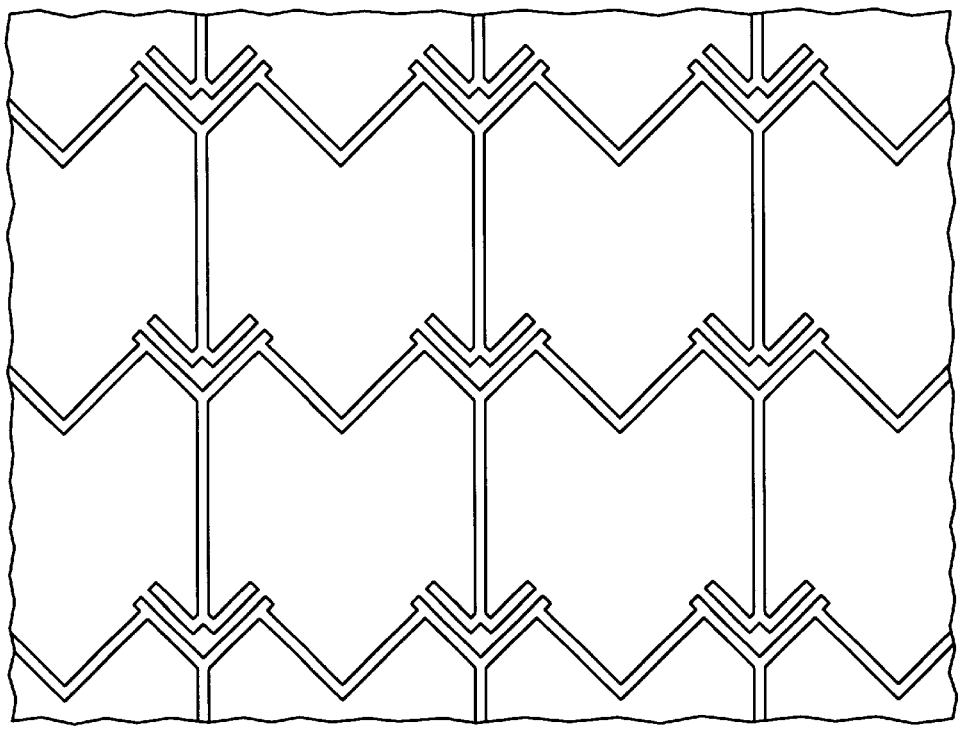
Figure 20H:
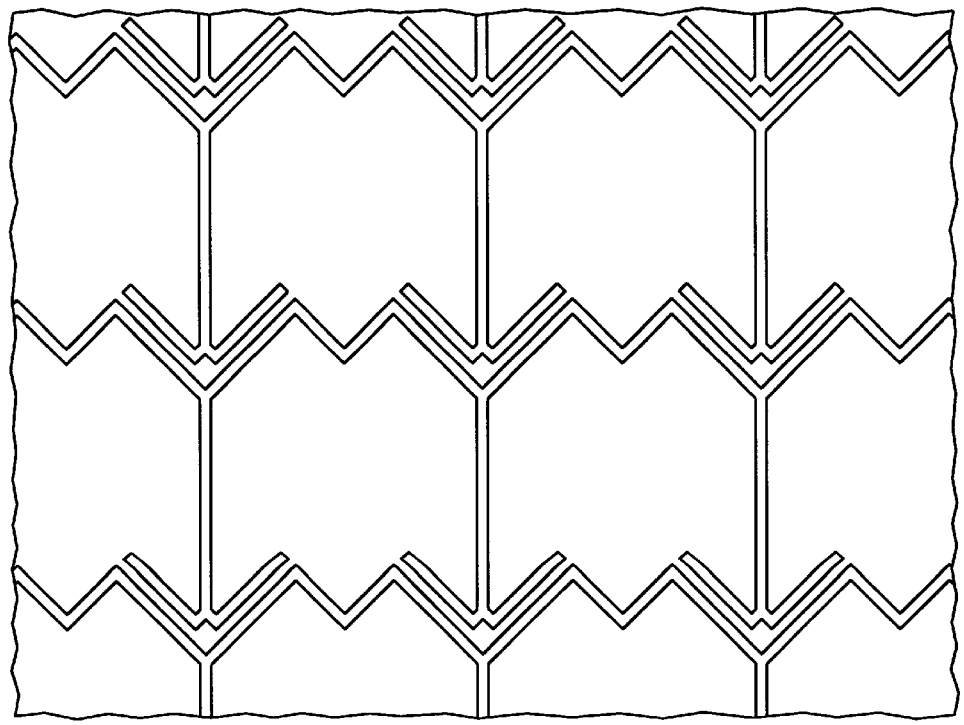
Figure 20I:
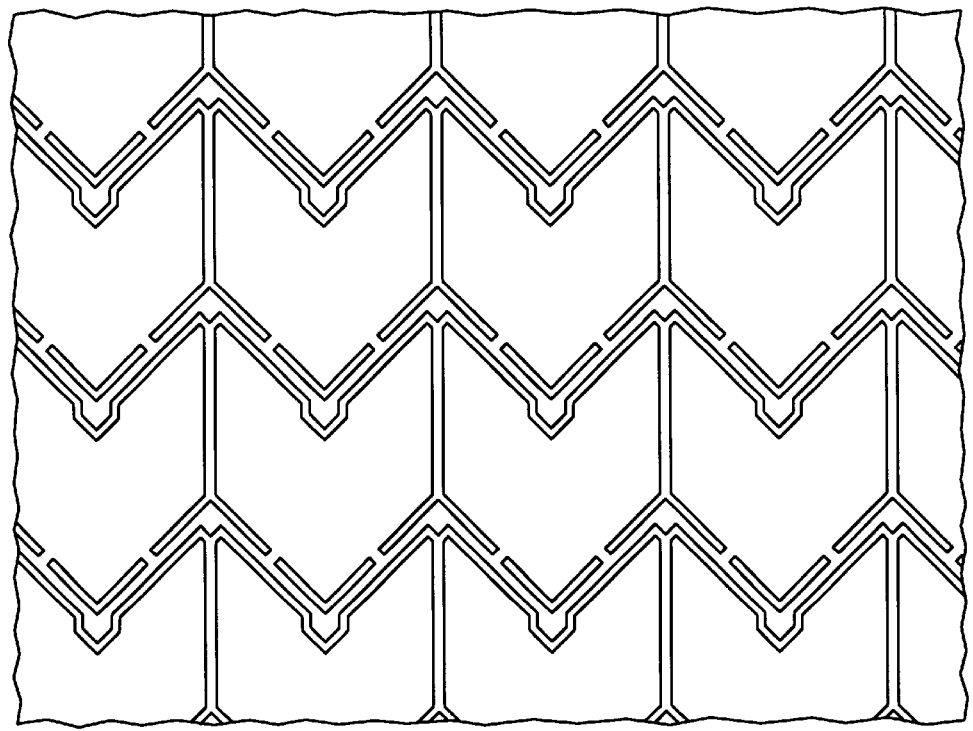
Figure 20J:
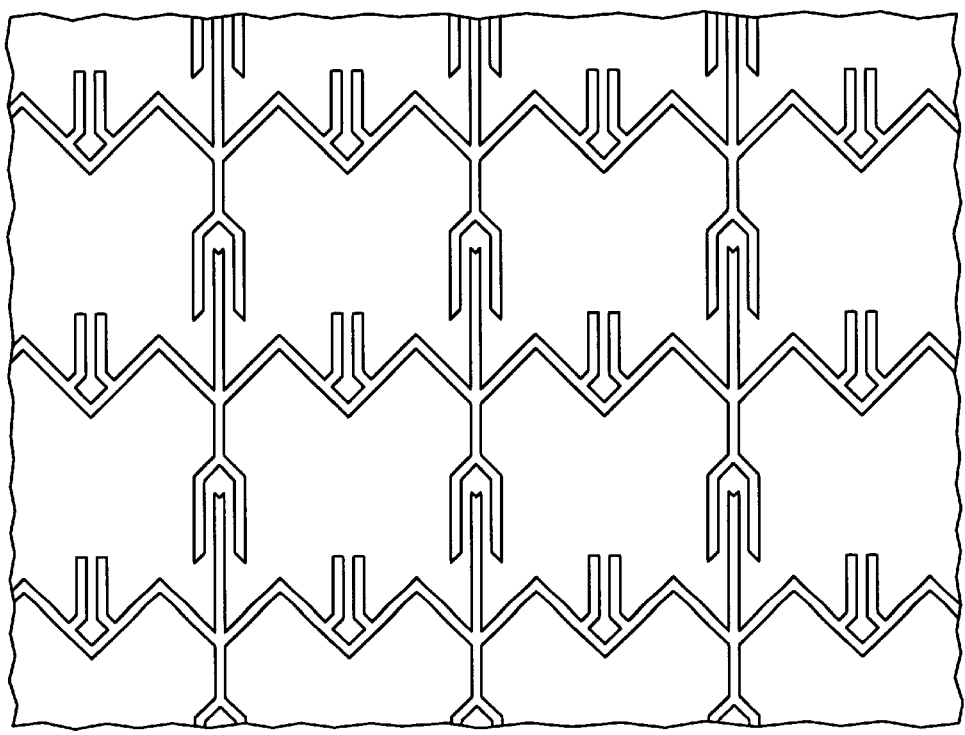
Figure 20K:
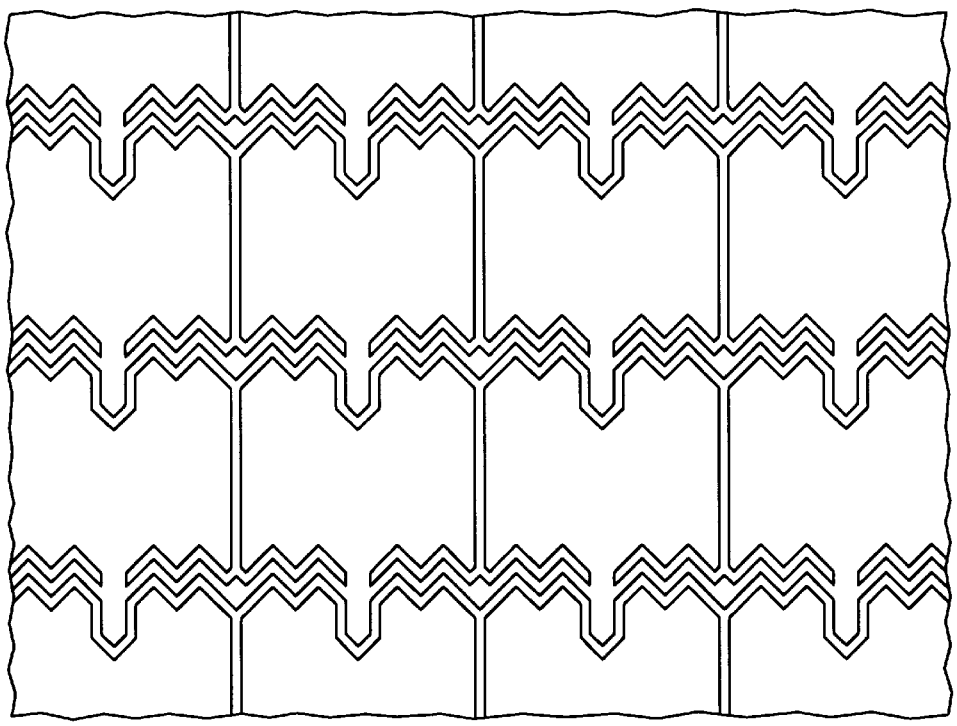
Figure 20L:
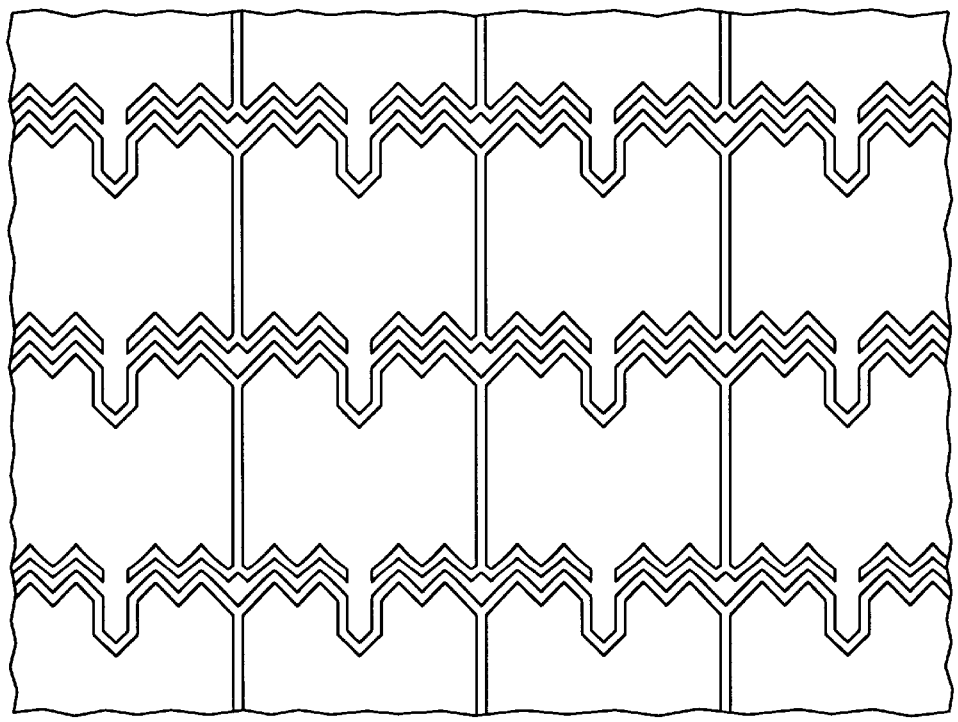

FIGS. 20A to 20D illustrate possible hinges for the mirrors of the present invention. Similar to FIG. 16, FIG. 20A illustrates mirrors with flexures 96 extending parallel to the incident light beam (when viewed as a top view as in this figure) and connecting mirror 97 to support post 98 which holds the mirror element on the substrate. Incident light could be directed at the array in the direction of arrows 5 or 6 in FIG. 20A (as viewed from above). Of course the incident light would originate out of plane (see FIGS. 7A to 7E). Such incident light would be the same for FIGS. 20B to 20L. FIGS. 20C to 20E are further embodiments of this type of hinge. FIGS. 20F to 20L are illustrations of further hinge and mirror embodiments where, except for FIG. 20J, the hinges do not extend parallel to the incident light beam (or leading active area side) and yet can still result in the mirrors rotating around an axis of rotation perpendicular to the incident light beam.

Figure 21A:
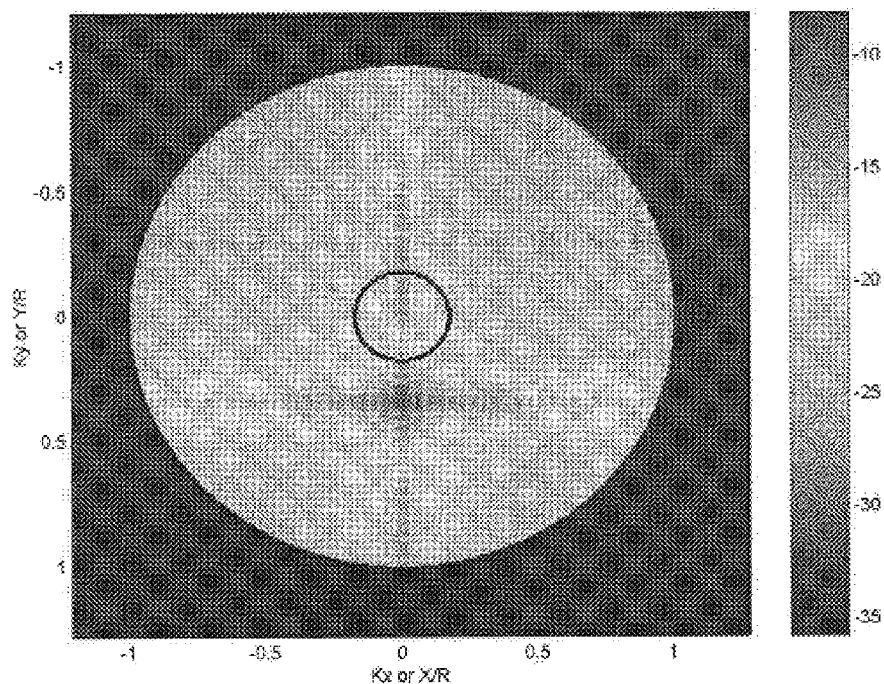
FIGS. 21A to 21C are illustrations of diffraction patterns having a diffraction line passing through the acceptance cone of the projection optics (21A) and avoiding the acceptance cone (21B and 21C).
Figure 21B:
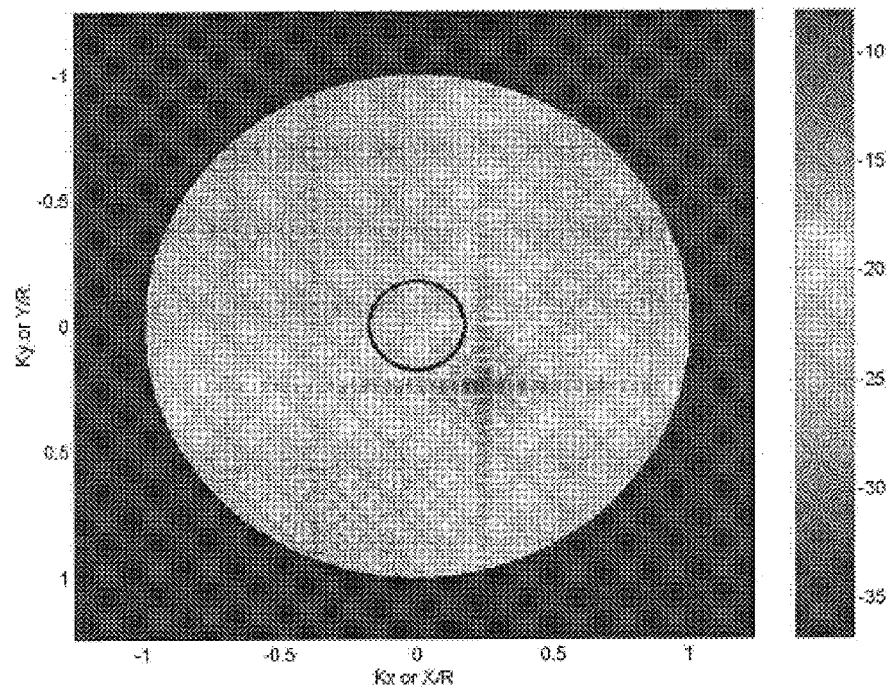

When mirror sides that are parallel to the rotation axis of the mirror (and perpendicular to the incident light beam) are not minimized, light diffracted by such mirror sides, will pass through the projection optics even if the mirror is in off-state, thus reducing the contrast ratio. As can be seen in FIG. 21A, a diffraction pattern (caused by illuminating an array of substantially square mirrors such as that of FIGS. 2 and 4 at an angle of 90 degree to the leading side of the array) in the shape of a "+" intersects the acceptance cone (the circle in the figure). The diffraction pattern can be seen in this figure as a series of dark dots (with a corresponding lighter background) that form one vertical and one horizontal line, and which cross just below the acceptance cone circle shown as a circular solid black line superposed onto the diffraction pattern). Though not shown, in the mirror's on-state, the two diffraction lines would cross within the acceptance cone circle. Therefore, as can be seen in FIG. 21A, the vertical diffraction line will enter the acceptance cone of the projection optics even when the mirror is in the off-state, thus harming the contrast ratio. FIG. 21B is a diffraction pattern caused by illuminating an array of square mirrors at a 45 degree angle. As can be seen in FIG. 21B, diffraction light passing into the acceptance cone (the small solid black circle in FIG. 21B) is reduced compared to FIG. 21A. However, as mentioned above, though diffraction can be reduced by such an illumination, other problems arise.

Figure 21C:
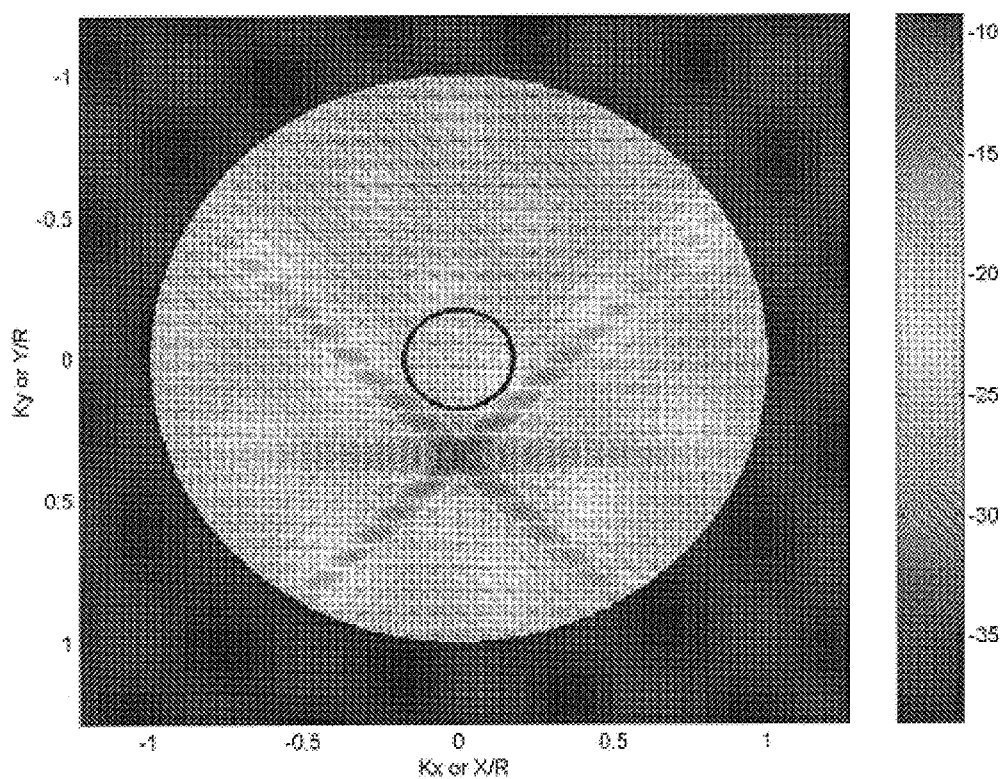

In contrast, as can be seen in FIG. 21C, the diffraction pattern of the present invention (mirror from FIG. 14B in off-state) does not have a diffraction line extending though the projection optics acceptance cone, or otherwise to the spatial region where light is directed when the mirror is in the on-state. Thus substantially no diffracted light is passed to the area where light is passed when the mirror is in the on-state. A mirror array producing such a diffraction pattern, with illumination light orthogonal to the sides of the active area of the array (and/or orthogonal to the columns or rows) is new. Likewise, the mirror designs, hinges therefore, and arrangement of light source to the mirrors, active area sides and/or addressing rows and columns are also new.

The invention has been described in terms of specific embodiments. Nevertheless, persons familiar with the field will appreciate that many variations exist in light of the embodiments described herein.

We claim:

1. A projection or direct-view light system, comprising:
    an array of active micromirrors disposed in a rectangular shape, the micromirrors capable of rotation around a switching axis between an off-state and an on-state, the micromirrors corresponding to pixels in a viewed image;
    a light source for directing light to the array of micromirrors, the light source disposed so as to direct light non-perpendicular to at least two sides of each micromirror, and parallel, when viewed as a top view of each micromirror, to at least two other sides of each micromirror while being incident on a plane of each micromirror at an angle;
    projection or viewing optics disposed to receive light from micromirrors in an on-state.

2. The system of claim 1, wherein the light source directs light at an angle substantially perpendicular to the switching axes of the micromirrors.

3. The system of claim 1, further comprising a color separating element provided between the light source and the micromirror array.

4. The system of claim 1, wherein the light source is disposed to direct light at the micromirrors such that the light impinges on a leading side of each micromirror at an angle of from 100 to 150 degrees.

5. The system of claim 1, wherein the micromirrors comprise metal and a dielectric material.

6. The system of claim 5, wherein the dielectric material is a nitride, carbide or oxide of silicon.

7. The system of claim 1, wherein the micromirrors are disposed above a circuit substrate.

8. The system of claim 7, wherein the circuit substrate is a CMOS substrate.

9. The system of claim 1, wherein the micromirrors are attached to an upper glass substrate which is bonded to a lower silicon substrate.

10. The system of claim 9, wherein the upper and lower substrates are held together via UV or IR epoxy.

11. The system of claim 1, wherein from 64,000 to about 6,000,000 micromirrors are provided in an area of from about 1 $cm^2$ to about 1 $in^2$.

12. The system of claim 11, further comprising a rectangular mask disposed on or above the micromirror array.

13. The system of claim 1, wherein the micromirror array comprises four corner active micromirrors which define a rectangle with four sides.

14. The system of claim 13, wherein the micromirrors comprise at least four elongated mirror sides, one or more of the mirror sides being neither parallel nor perpendicular to any side of the rectangle defined by the four corner active micromirrors.

15. The system of claim 14, wherein no mirror side is parallel or perpendicular to any side of the micromirror rectangle array.

16. The system of claim 14, wherein at least two mirror sides are neither parallel or perpendicular to the sides of the micromirror array rectangle, and wherein at least two mirror sides are parallel to sides of the micromirror array rectangle.

17. The system of claim 1, wherein each micromirror comprises one or more hinges that extend in a direction at an angle between 0 and 90 degrees from the axis of rotation of the micromirror.

18. The system of claim 17, wherein the one or more hinges extend at an angle of about 45 degrees to the direction of the axis of rotation.

19. The system of claim 1, wherein each micromirror has a shape of a parallelogram or an assembly of parallelograms.

20. The system of claim 19, wherein each micromirror has a shape of an assembly of from 2 to 7 parallelograms.

21. The system of claim 20, wherein each micromirror has a shape of an assembly of from 2 to 4 parallelograms.

22. The system of claim 20, wherein the shape as an assembly of parallelograms appears as a series of parallelograms each a mirror image of an adjacent parallelogram.

23. The system of claim 20, wherein the shape as an assembly of parallelograms appears as a series of identical parallelograms.

24. The system of claim 1, wherein said at least two sides are on the leading and/or trailing sides of the micromirrors.

25. The system of claim 24, wherein the leading and trailing sides are jagged or saw-tooth sides.

26. The system of claim 20, wherein the width of each parallelogram in the assembly has a width substantially greater than the wavelength of light directed at the micromirrors.

27. The system of claim 19, wherein the number of parallelograms is less than M/λ, where M is the width of the micromirror and λ is the wavelength of incident light.

28. The system of claim 27, wherein the number of parallelograms is less than 0.5 M/λ.

29. The system of claim 28, wherein the number of parallelograms is less than 0.1 M/λ.

30. The system of claim 1, wherein the micromirrors comprises 5 or more elongated straight sides.

31. The system of claim 30, wherein the 6 or more sides form a shape with at least one projection and cut-out.

32. The system of claim 30, wherein the micromirrors comprise 8 or more sides.

33. The system of claim 31, wherein the projection and cut-out are in the form of a triangle.

34. The system of claim 31, wherein the projection forms an exterior angle of from 70 to 120 degrees, and the cut-out forms a corresponding interior angle of from 70 to 120 degrees.

35. The system of claim 1, wherein the micromirrors have shapes other than substantially rectangular.

36. The system of claim 1, wherein the micromirrors have at least two exterior angles of between 35 and 60 degrees.

37. The system of claim 1, wherein the micromirrors have straight sides that are neither parallel nor perpendicular to the sides of the rectangular active area.

38. A projection or direct view light system, comprising:
an array of micromirrors, each micromirror corresponding to a pixel in a viewed image and having a shape of a concave polygon or one or more non-rectangular parallelograms;
a light source for directing light to the array of micromirrors
projection or viewing optics disposed to receive light reflected from the micromirrors.

39. The system of claim 38, wherein each micromirror has a shape of a non-rectangular parallelogram or an assembly of non-rectangular parallelograms side by side.

40. The system of claim 39, wherein each micromirror has a shape of an assembly of from 2 to 7 parallelograms.

41. The system of claim 40, wherein each micromirror has a shape of an assembly of from 2 to 4 parallelograms.

42. The system of claim 40, wherein the shape as an assembly of parallelograms appears as a series of parallelograms each a mirror image of an adjacent parallelogram.

43. The system of claim 40, wherein the shape is a concave polygon having six or more sides and at least one concave portion.

44. The system of claim 38, wherein said at least two sides are on the leading and/or trailing sides of the micromirrors.

45. The system of claim 44, wherein the leading and trailing sides are jagged or saw-tooth sides.

46. The system of claim 40, wherein the width of each parallelogram in the assembly has a width substantially greater than the wavelength of light directed at the micromirrors.

47. The system of claim 39, wherein the number of parallelograms is less than M/λ, where M is the width of the micromirror and λ is the wavelength of incident light.

48. The system of claim 47, wherein the number of parallelograms is less than 0.5 M/λ.

49. The system of claim 48, wherein the number of parallelograms is less than 0.1 M/λ.

50. The system of claim 38, wherein the micromirrors comprise 6 or more elongated straight sides.

51. The system of claim 50, wherein the 6 or more sides form a shape with at least one projection and cut-out.

52. The system of claim 50, wherein the micromirrors comprise 8 or more sides.

53. The system of claim 51, wherein the projection and cut-out are in the form of a triangle.

54. The system of claim 51, wherein the projection forms an exterior angle of from 70 to 120 degrees, and the cut-out forms a corresponding interior angle of from 70 to 120 degrees.

55. The system of claim 38, wherein the micromirrors have shapes that are substantially different from a square shape.

56. The system of claim 38, wherein the micromirrors have at least two exterior angles of between 35 and 60 degrees.

57. The system of claim 38, wherein the micromirrors have straight sides that are neither parallel nor perpendicular to the sides of the rectangular active area.

58. The system of claim 38, wherein each micromirror has the shape of a concave polygon having more than 4 sides and 4 angles.

59. An array of movable micromirrors, the array having a substantially rectangular shape and comprising at least 1,000 micromirrors, wherein the micromirrors are in the shape of a concave or convex polygon and wherein no sides of the polygonal micromirrors are parallel to the sides of the substantially rectangular active area.

60. The array of claim 59, wherein the mirrors have at least 4 substantially straight sides, none of which are parallel to leading or trailing sides of the rectangular active area.

61. The array of claim 60, wherein the array comprises four corner micromirrors which, when connected together, form the rectangular shape of the array.

62. The array of claim 59, wherein the micromirrors have switching axes parallel to at least two sides of the rectangular array.

63. The array of claim 59, wherein each micromirror has a shape of a parallelogram or an assembly of parallelograms.

64. The array of claim 63, wherein each micromirror has a shape of an assembly of from 2 to 7 parallelograms.

65. The array of claim 64, wherein each micromirror has a shape of an assembly of from 2 to 4 parallelograms.

66. The array of claim 64, wherein the shape as an assembly of parallelograms appears as a series of parallelograms each a mirror image of an adjacent parallelogram.

67. The array of claim 64, wherein the shape as an assembly of parallelograms appears as a series of identical parallelograms.

68. The array of claim of claim 59, wherein the micromirrors comprises 5 or more elongated straight sides.

69. The array of claim 68, wherein the micromirrors comprise 6 or more sides form a shape with at least one projection and cut-out.

70. The array of claim 68, wherein the micromirrors comprise 8 or more sides.

71. The array of claim 69, wherein the projection and cut-out are in the form of a triangle.

72. The array of claim 69, wherein the projection forms an exterior angle of from 70 to 120 degrees, and the cut-out forms a corresponding interior angle of from 70 to 120 degrees.

73. The array of claim 59, wherein the micromirrors have at least two polygon sides that form an angle therebetween of less than 90 degrees.

74. The array of claim 73, wherein the micromirrors have at least two polygon sides that form an angle therebetween of from 35 to 60 degrees.

75. The array of claim 59, wherein the micromirrors each have a shape of an assembly of from 1 to 10 parallelograms.

76. The array of claim 59, wherein the micromirrors have sides that are about 35 to 55 degrees to the sides of the active area.

77. A projection system comprising a light source for providing an incident light beam, an array of movable reflective elements, and projection optics for projecting light from the array, wherein an image projected from the projection system will appear on a target as a rectangular image, with the image being formed of from thousands to millions of pixels, each pixel being in the shape of a concave polygon, a single non-rectangular parallelogram, or an assembly of non-rectangular parallelograms.

78. The projection system of claim 77, wherein each pixel in the projected image is a concave polygon having more than 4 sides and 4 angles.

79. The projection system of claim 77, where no pixel sides are parallel to at least two of the sides of the rectangular projected image.

80. The projection system of claim 77, wherein at least two pixel sides are non-parallel and non-perpendicular to the projected image sides, and wherein at least two pixel sides are parallel and perpendicular to projected image sides.

81. The projection system of claim 77, wherein at least one pixel side extends in a direction at an angle of from 35 to 85 degrees from one of the projected image sides.

82. The projection system of claim 81, wherein at least two pixel sides extend in a direction at an angle of from 40 to 55 degrees from at least one of the projected image sides.

83. A projection system comprising a light source, an array of movable mirror elements, and projection optics, wherein each mirror element in the array has a switching axis substantially parallel to at least one side of the active area of the array, and at an angle of from 35 to 60 degrees to one or more sides of the mirror element.

84. A projection system comprising a light source and an array of movable mirror elements, each mirror element having a leading side that is non-perpendicular to the incident light beam, and non-perpendicular to any side of the active area, so as to achieve an increase of 2 to 10 times the contrast ratio compared to mirror elements having perpendicular sides to the incident light beam.

85. A projection system comprising a light source and a rectangular array of movable mirrors, the mirrors capable of moving between an on-state and an off-state and capable of reflecting light in the on-state to a predetermined spatial area, wherein the light source is disposed to direct light at a substantially 90 degree angle to at least one side of the rectangle defined by the array, and wherein substantially no diffracted light enters the predetermined spatial area when the mirrors are in the off-state.

86. A method for projecting an image on a target comprising:
    directing a light beam onto a rectangular array of mirrors, the light beam directed to the leading side of the rectangular array at an angle within a range of 90 degrees plus or minus 40 degrees, and wherein the mirrors in the array are shaped as polygons and positioned such that the light beam is incident on all of the polygonal sides at angles other than 90 degrees; and
    projecting the light from the mirrors onto a target so as to form an image thereon.

87. The method of claim 86, wherein the light beam is incident on the leading side of the rectangular array substantially perpendicularly.

88. An array of pivotable mirrors, each mirror having a pivot axis, and each mirror having one or more elongated sides that extend at an angle of less than 45 degrees to the pivot axis.

89. The array of claim 88, wherein the angle is from 30 to 42.5 degrees.

90. An array of movable mirrors, each mirror having four or more sides, wherein two of the sides come together at an angle of less than 90 degrees.

91. The array of claim 90, wherein the angle is from 45 to 85 degrees.

* * * * *